(12) United States Patent
Duffield et al.

(10) Patent No.: US 12,619,599 B2
(45) Date of Patent: May 5, 2026

(54) PROJECTIONS FOR BIG DATABASE SYSTEMS

(71) Applicant: Palantir Technologies Inc., Denver, CO (US)

(72) Inventors: Benjamin Duffield, New York, NY (US); Joshua Casale, Seattle, WA (US); Mark Elliot, New York, NY (US); Matthew Sills, New York, NY (US); Robert Kruszewski, London (GB); Rahij Ramsharan, London (GB)

(73) Assignee: Palantir Technologies Inc., Aventura, FL (US)

( * ) Notice: Subject to any disclaimer, the term of this patent is extended or adjusted under 35 U.S.C. 154(b) by 0 days.

(21) Appl. No.: 18/178,294

(22) Filed: Mar. 3, 2023

(65) Prior Publication Data

US 2023/0281191 A1     Sep. 7, 2023

Related U.S. Application Data

(63) Continuation of application No. 17/444,715, filed on Aug. 9, 2021, now Pat. No. 11,620,280.

(Continued)

(51) Int. Cl.
*G06F 16/2455* (2019.01)
*G06F 16/23* (2019.01)
(Continued)

(52) U.S. Cl.
CPC ...... *G06F 16/2379* (2019.01); *G06F 16/2455* (2019.01); *G06F 16/248* (2019.01); *G06F 16/273* (2019.01)

(58) Field of Classification Search
CPC .............. G06F 16/2379; G06F 16/273; G06F 16/2455; G06F 16/248
See application file for complete search history.

(56) References Cited

U.S. PATENT DOCUMENTS 7,673,099 B1 *   3/2010   Beaverson .......... G06F 12/0866
                                                711/118
7,685,083 B2     3/2010   Fairweather
                     (Continued)

FOREIGN PATENT DOCUMENTS

CN          111159213 A  *  5/2020   ........... G06F 16/242
EP          3958142         2/2022

OTHER PUBLICATIONS

Official Communication for European Patent Application No. 21192024.4 dated May 16, 2023.

(Continued)

*Primary Examiner* — Amy Ng
*Assistant Examiner* — Antonio J Caiado
(74) *Attorney, Agent, or Firm* — Knobbe, Martens, Olson & Bear, LLP

(57) ABSTRACT

A database system comprised of a decoupled compute layer and storage layer is implemented to store, build, and maintain a canonical dataset, a temporary buffer, and projection datasets. The canonical dataset is a set of batch updated data. The data is appended in chunks to the canonical dataset such that the canonical dataset becomes a historical dataset over time. The buffer is a write ahead log that contains the most recent chunks of data and provides atomicity and durability for the database system. The projection datasets are indexes of the canonical dataset and/or the buffer that may have single or multiple column sort-orders and/or particular data formats. The writes to the canonical dataset, projection datasets, and buffer may be asynchronous and therefore the database system is advantageously less resource constrained.

18 Claims, 10 Drawing Sheets

Related U.S. Application Data

(60) Provisional application No. 63/067,596, filed on Aug. 19, 2020.

(51) Int. Cl.
 *G06F 16/248* (2019.01)
 *G06F 16/27* (2019.01)

(56) References Cited

U.S. PATENT DOCUMENTS

| | | | | |
|---|---|---|---|---|
| 9,846,567 | B2* | 12/2017 | Kaushik | G06F 16/221 |
| 10,303,516 | B1* | 5/2019 | Ward | G06F 11/3419 |
| 10,360,215 | B1* | 7/2019 | Ciarlini | G06F 16/2264 |
| 10,373,267 | B2* | 8/2019 | Chang | G06Q 40/12 |
| 10,698,854 | B1 | 6/2020 | Waishaupt et al. | |
| 10,740,312 | B1 | 8/2020 | Mritunjai et al. | |
| 11,620,280 | B2 | 4/2023 | Duffield et al. | |
| 2003/0191752 | A1 | 10/2003 | Fairweather | |
| 2004/0212619 | A1* | 10/2004 | Saito | G06T 11/40 |
| | | | | 345/441 |
| 2004/0225670 | A1* | 11/2004 | Cameron | G06F 16/282 |
| 2004/0255048 | A1 | 12/2004 | Lev Ran et al. | |
| 2007/0112714 | A1 | 5/2007 | Fairweather | |
| 2010/0169392 | A1 | 7/2010 | Lev Ran et al. | |
| 2012/0311237 | A1* | 12/2012 | Park | G06F 12/0246 |
| | | | | 711/E12.008 |
| 2014/0208041 | A1* | 7/2014 | Hyde | G11C 7/1006 |
| | | | | 711/146 |
| 2015/0242762 | A1* | 8/2015 | Cox | G06N 5/025 |
| | | | | 706/11 |
| 2015/0363167 | A1* | 12/2015 | Kaushik | G06F 16/221 |
| | | | | 707/753 |
| 2016/0012108 | A1* | 1/2016 | Hu | G06F 16/24532 |
| | | | | 707/771 |
| 2017/0046329 | A1* | 2/2017 | Mirhaji | G06F 16/22 |
| 2018/0067978 | A1* | 3/2018 | Matsuura | G06F 11/3476 |
| 2018/0196850 | A1* | 7/2018 | Schaeffer | G06F 16/24542 |
| 2018/0205552 | A1 | 7/2018 | Struttmann et al. | |
| 2019/0205773 | A1* | 7/2019 | Ackerman | H03K 19/18 |
| 2020/0004736 | A1* | 1/2020 | Liu | G06F 16/2455 |
| 2020/0026620 | A1 | 1/2020 | Skowronski et al. | |
| 2021/0385251 | A1* | 12/2021 | Crabtree | G06F 16/951 |
| 2022/0004568 | A1* | 1/2022 | Patil | G06F 16/1873 |
| 2022/0027379 | A1* | 1/2022 | Unterbrunner | G06F 16/254 |
| 2022/0059029 | A1* | 2/2022 | Kishimoto | H04N 5/66 |
| 2022/0067038 | A1* | 3/2022 | Ponnamperuma Arachchi | G06F 16/243 |
| 2023/0359671 | A1* | 11/2023 | Teflioudi | G06F 16/90335 |
| 2023/0386473 | A1* | 11/2023 | Li | G10L 15/02 |

OTHER PUBLICATIONS

Official Communication for European Patent Application No. 21192024.4 dated Jan. 12, 2022, 10 pages.

Plattner et al., "Organizing and Accessing Data in SanssouciDB—In-Memory Data Management: An Inflection Point for Enterprise Applications", Mar. 5, 2011, Springer-Verlag, 62 pages.

Official Communication for European Patent Application No. 21192024.4 dated Jan. 29, 2026, 9 pages.

* cited by examiner

RECEIVE DATA CHUNK(S) COMPRISING NEW DATA AND/OR EDIT(S) TO THE CANONICAL DATASET
302

TEMPORARILY STORE THE DATA CHUNK(S) IN A BUFFER
304

ASYNCHRONOUSLY UPDATE THE CANONICAL DATASET BASED ON THE DATA CHUNK(S)
306

ASYNCHRONOUSLY UPDATE THE PROJECTION DATASET(S) BASED ON AT LEAST A PART OF THE DATA CHUNK(S) AND PROJECTION RULE(S)
308

FLUSH THE DATA CHUNK(S) FROM THE BUFFER
309

300

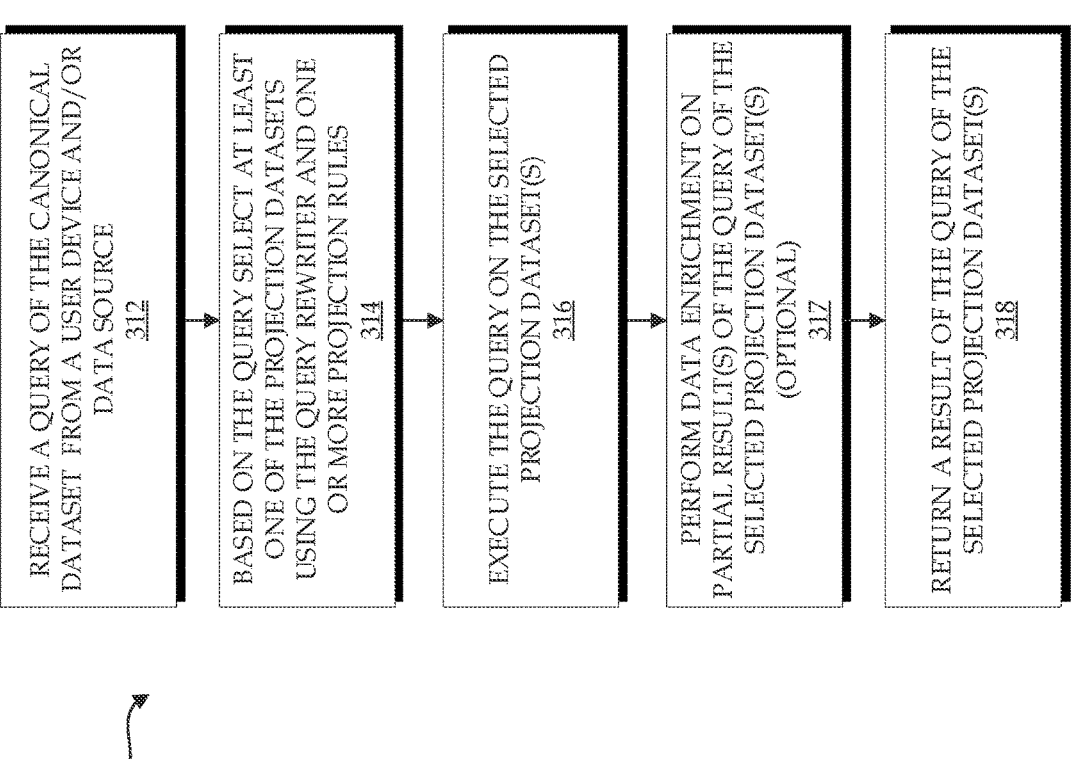

RECEIVE A QUERY OF THE CANONICAL DATASET FROM A USER DEVICE AND/OR DATA SOURCE
312

BASED ON THE QUERY SELECT AT LEAST ONE OF THE PROJECTION DATASETS USING THE QUERY REWRITER AND ONE OR MORE PROJECTION RULES
314

EXECUTE THE QUERY ON THE SELECTED PROJECTION DATASET(S)
316

PERFORM DATA ENRICHMENT ON PARTIAL RESULT(S) OF THE QUERY OF THE SELECTED PROJECTION DATASET(S) (OPTIONAL)
317

RETURN A RESULT OF THE QUERY OF THE SELECTED PROJECTION DATASET(S)
318

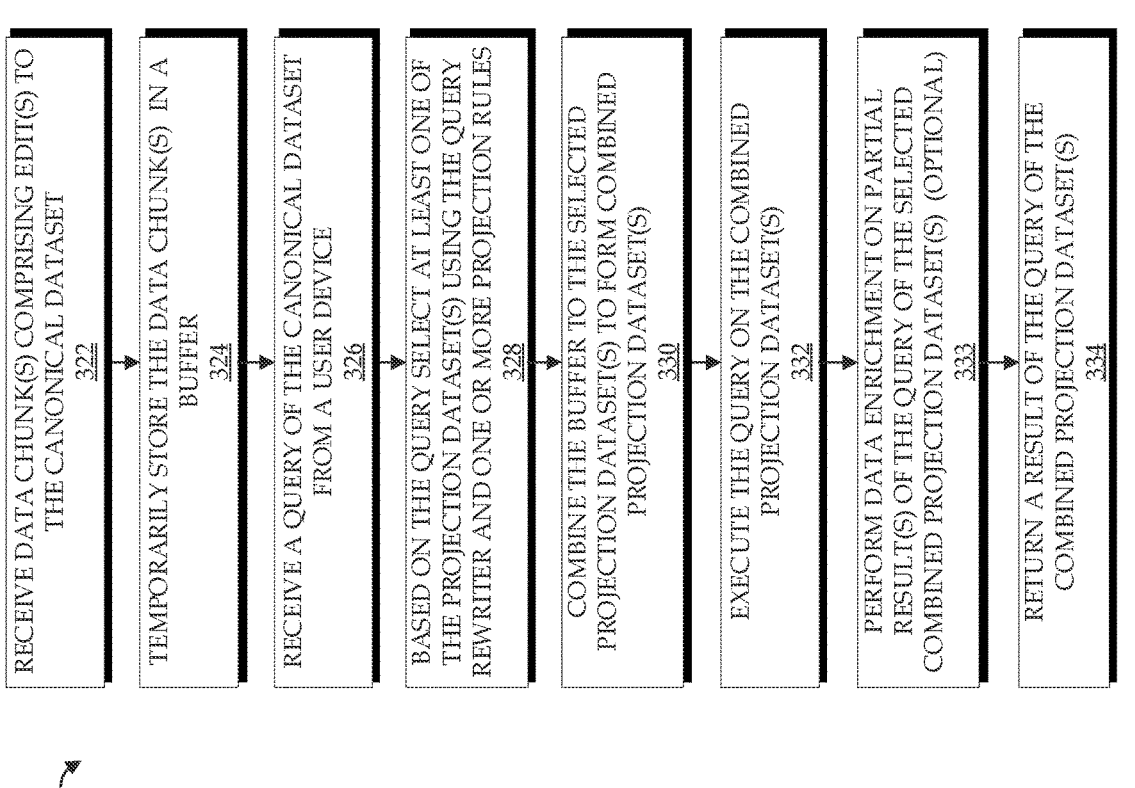

RECEIVE DATA CHUNK(S) COMPRISING EDIT(S) TO THE CANONICAL DATASET
322

TEMPORARILY STORE THE DATA CHUNK(S) IN A BUFFER
324

RECEIVE A QUERY OF THE CANONICAL DATASET FROM A USER DEVICE
326

BASED ON THE QUERY SELECT AT LEAST ONE OF THE PROJECTION DATASET(S) USING THE QUERY REWRITER AND ONE OR MORE PROJECTION RULES
328

COMBINE THE BUFFER TO THE SELECTED PROJECTION DATASET(S) TO FORM COMBINED PROJECTION DATASET(S)
330

EXECUTE THE QUERY ON THE COMBINED PROJECTION DATASET(S)
332

PERFORM DATA ENRICHMENT ON PARTIAL RESULT(S) OF THE QUERY OF THE SELECTED COMBINED PROJECTION DATASET(S) (OPTIONAL)
333

RETURN A RESULT OF THE QUERY OF THE COMBINED PROJECTION DATASET(S)
334

PROJECTIONS FOR BIG DATABASE SYSTEMS

CROSS-REFERENCE TO RELATED APPLICATIONS

This application is a continuation of U.S. patent application Ser. No. 17/444,715, filed on Aug. 9, 2021, and titled "PROJECTIONS FOR BIG DATABASE SYSTEMS," which claims a priority benefit under 35 U.S.C. § 119 to U.S. Provisional Patent Application No. 63/067,596, filed on Aug. 19, 2020, and titled "PROJECTIONS FOR BIG DATABASE SYSTEMS." The disclosures of each of the aforementioned applications are incorporated herein in their entireties for all purposes. Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for data integration, analysis, and visualization. More specifically, projections for immutable versioned big database systems.

BACKGROUND

A database system may store large quantities of data. For example, a database system may store on the scale of petabytes to exabytes worth of data. However, such big database systems often require specialized architecture, management, processing, and/or maintenance methodologies in order to maintain the big database system, and there may be tradeoffs between different approaches.

For example, some existing database systems, such as Online Analytical Processing (OLAP) systems, are designed for applying complex queries to large amounts of historical data and allow for rapid execution time by multiple simultaneous users or perspectives. In some cases, this can be accomplished using versioned datasets, which may improve query speed at the cost of write speed. In other words, the emphasis on response time to complex queries means that these OLAP database systems may not be able to provide the same level of performance with regards to rapidly writing to, and updating, datasets.

In contrast, other database systems, such as Online Transactional Processing (OLTP) database systems, are designed for quickly processing a large volume of transactions that may comprise many different kinds of instructions (e.g., read, insert, update and delete). OLTP database systems are not designed specifically to rapidly execute complex queries and instead prioritize the rapid updating of datasets, allowing datasets to be written to and updated frequently with low latency and high data integrity. Accordingly, OLTP database systems are not designed specifically to rapidly execute complex queries and instead prioritize the rapid updating of datasets. Due to these tradeoffs between query performance and write performance, a decision usually has to be made between low latency complex querying or low latency editing.

SUMMARY

The systems, methods, and devices described herein each have several aspects, no single one of which is solely responsible for its desirable attributes. Without limiting the scope of this disclosure, several non-limiting features will now be discussed briefly.

Designing and creating a database system that provides both low latency complex querying and low latency editing is a difficult task, especially when large amounts of data (e.g., petabytes, exabytes etc.) must be stored and queried, or when streaming data is involved. Furthermore, the use of versioned datasets for reducing the latency of complex querying (e.g., by storing multiple data copies) can greatly add to the complexity of the system and will often result in a tremendous increase in the amount of data being stored, more datasets that need to be updated, and additional processing needed to update the datasets. Thus, there exists a need for a database system which are capable of using versioned datasets to provide both low latency complex querying and low latency editing, and which allow for the use of streaming data.

Described herein is a database system that may serve as a general data store that is capable of handling datasets or collections of data that are of varying sizes (e.g., from a hundred bytes to terabytes and larger) and formats (e.g., bytes for a table). The components of this database system cooperate and work together in a manner that enables both low-latency edits and low-latency reads for large scale OLAP-oriented database systems, thereby bridging the divide between OLAP and OLTP database systems. The database system may provide low-latency reads through the use of versioned datasets. In particular, multiple projection datasets can be generated and associated with a canonical dataset. Each projection dataset may contain a subset of the data in the canonical dataset and that data may be organized in a particular way depending on the configuration of the projection dataset. In various different scenarios, these projection datasets may provide faster querying over the canonical dataset, and they can be used instead for processing the query. Thus, depending on the query, the database system may be able to select and use the projection dataset(s) that will be fastest for processing a particular query.

The database system may be comprised of a decoupled compute layer and storage layer. The database system may be configured to store, build, and maintain a canonical dataset. The database system may also be configured to store, build, and maintain a temporary buffer and one or more projection datasets associated with the canonical dataset.

In some embodiments, the canonical dataset may be thought of as a set of batch updated historical data. Data can be appended in chunks to the canonical dataset such that the canonical dataset becomes a historical dataset over time. In some embodiments, the buffer is a write-ahead log that contains the most recent chunks of data received by the database system, and the buffer provides atomicity and durability for the database system. In some embodiments, the projection datasets for a canonical dataset are indexes of the canonical dataset and/or the buffer. The projection datasets may include a subset of the data in the canonical dataset and/or the buffer, and they may have single or multiple column sort-orders and/or particular data formats.

In some embodiments, as the database system receives new chunks of data, the database system may update the canonical dataset, projection datasets, and buffer asynchronously whenever resources become available to the database system, which allows the database system to be advantageously less resource constrained.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 3B is an example flow chart of the query workflow with the canonical dataset, query rewriter and projection datasets.

FIG. 3C is an example flow chart of the data and query workflow with the canonical dataset, query rewriter, and projection datasets.

DETAILED DESCRIPTION

Overview

Figure 1:
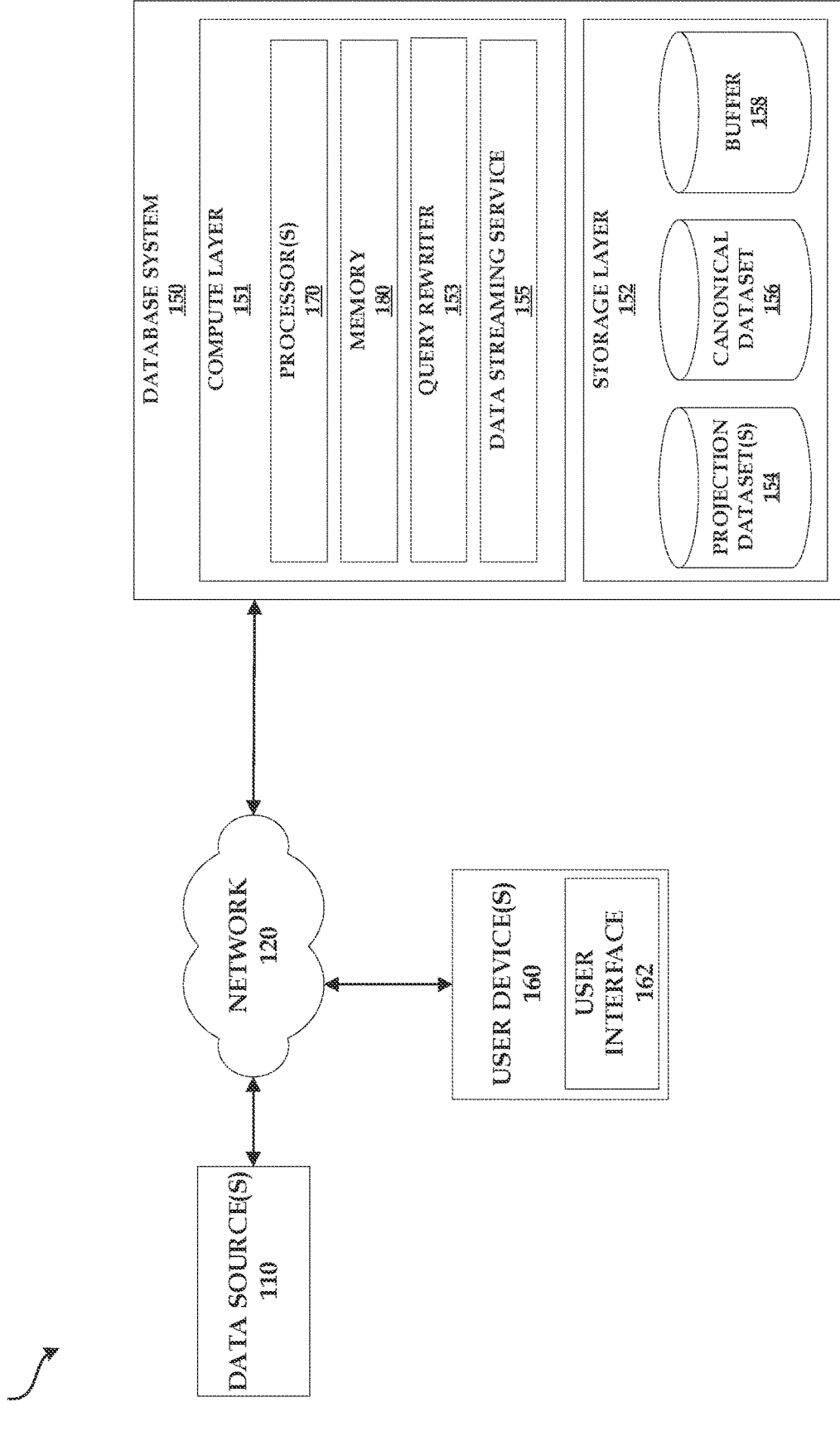
FIG. 1 is a block diagram illustrating a database system environment.

The use of versioned datasets, including the use of projection datasets, can allow for faster querying—particularly for certain kinds of stream workflows, in which there may be streaming batch updates that accrue in a way that is difficult to query and process for traditional database systems. For example, data may be streamed by having a new batch of incoming data arrive every fifteen minutes. Users may wish to query the entire collection of data in real-time (e.g., no more than thirty seconds worth of latency to execute a variety of queries), and this may include large queries (e.g., searching trillions of records to obtain a results set of hundreds of millions of records) that require additional processing (e.g., filtering and summarizing over the results set). In some cases, data records may arrive and be saved in an order that corresponds to when those data records were generated/observed—which may be convenient for ingestion but inefficient for querying (e.g., retrieving all the data items from the last thirty days that meet a set of criteria would require combing through thirty days' worth of data).

In order to handle queries within this kind of context, a database system may be configured to do prefix matching and full-stream matching. The speed of querying can be improved by performing the functional equivalent of search indexing on incoming data and parsing it in a way that makes it easier to do prefix and exact-match searches. To expand on this idea even further, querying speed can be improved by arranging the data in different sort orders through the use of projection datasets. In other words, multiple projections of a dataset can be generated, which may be different subsets of the dataset that are organized by different sort orders. These projections may be specifically prepared to contain the data necessary for processing (and improving the speed of processing)—specific types of queries. By having multiple projections of a dataset, the database system can process a query of the dataset by smartly deciding which projection is most-relevant (e.g., best tailored for quickly processing that query) and then using that projection to process the query.

In other words, certain repetitive steps that are typically performed at materialization time over the course of many queries and are computationally expensive (e.g., sorting the data) can instead be performed in advance as a one-time step instead of a per-user-per-query step. This can greatly improve the speed and efficiency of query processing, even though more data would have to be stored by the database system. This is because, as a general principle, it is easier to search sorted data than unsorted data, and it can actually be more efficient to store sorted data because the sorted data may be easier to compress due to how the data is organized.

Thus, it is possible to store multiple copies of a dataset (that are differentiated based on data ordering) without requiring excessive storage capacity.

Thus, in order to improve query speed, the database system contemplated herein may be configured to store, build, and maintain a canonical dataset and one or more projection datasets associated with the canonical dataset. In some embodiments, the canonical dataset may be thought of as a set of batch updated historical data. Data can be appended in chunks to the canonical dataset such that the canonical dataset becomes a historical dataset over time. The database system may also be configured to store, build, and maintain a temporary buffer associated with the canonical dataset. In some embodiments, the buffer is a write-ahead log that contains the most recent chunks of data received by the database system.

In some embodiments, a projection dataset for a canonical dataset can be an index of the canonical dataset and/or the buffer. In some embodiments, a projection dataset may be a copy of the data in the canonical dataset that has been optimized in some way, or the projection dataset may include only a subset of the data in the canonical dataset and/or the buffer. (e.g., the projection dataset may be partial, in that, the projection dataset does not include all of the original columns from the canonical dataset and/or the buffer). Different projection datasets may have varying sort orders and configurations, resulting in some projection datasets being better tailored for processing a particular query. In some embodiments, a projected dataset may be selected for use to process a query when the projected dataset is likely to be performance improving (e.g., where sort order is likely to assist in greater levels of metadata-based pruning and/or where sort order is likely to improve join or scan performance).

Thus, there may be multiple different projections associated with a canonical dataset. These different projections may be used to service a variety of queries with improved query performance. In some embodiments, these projections may be re-orderings of the full dataset by different criteria. In some embodiments, these projections may also contain different subsets of the full dataset. For example, a projection may be based on a subset of the columns of the buffer (e.g., three columns of the buffer can be sorted by one of the columns and then projected). In some embodiments, the projections may also include rollups or aggregations of the data (e.g., similar to aggregations returned in a query). In scenarios in which the query involves aggregating data, the aggregate projection can be directly used and combined with an aggregation on the tail of the buffer. In some embodiments, these projections may contain data in the canonical dataset that has been de-duplicated based on a primary key.

To put it another way, the projections can be thought of as modified copies of a canonical dataset that are generated and stored. As the number of projections for a canonical dataset increases, there are more projections that have to be updated as new data is received. The database system may process projections and bring them up-to-date in the background. In some embodiments, the database system may rely on a service that incrementally updates the projections by with new data. Processing the projections to bring them up-to-date can be based on some sort of schedule or the available amount of resources the database system has. It can also be based on the relative usefulness of the different projections and how frequently they are queried. Thus, not all of the projections for a canonical dataset will be brought up-to-date at the same rate; at a particular moment in time, some projections for a canonical dataset may be more up-to-date than others.

It should be noted that it may be worth having many projections for servicing a variety of queries despite the additional storage requirements that would be associated with those projections. Unlike traditional database systems, which generally assume full projections (e.g., maintaining all the data in the full dataset), the size of each projection in the database system discussed herein may only be a fraction of the size of the full dataset depending on the quality of the data format used for the projections. For instance, projections with only a subset of the columns of the full dataset would be substantially smaller in size. Consider the example of a full dataset with thousands of columns, but users do not actually query all of the columns most of the time. If the users are mainly querying eight of the columns, then projections can be created just with those eight columns in order to improve query performance. In the rare instance that the user queries the other columns, the original canonical dataset is still available to perform a slower query on.

In some embodiments, the database system may be able to query a projection for results that are efficient to query the projection for, and then join those results back as a filter on the canonical dataset. For example, the canonical dataset may be sorted by ID and there may be projections which are sorted by field. In order to obtain a set of IDs that match a particular field, the database system could query the projection sorted by that particular field. If the initial query is for the full records of IDs that match a particular field, then the full records for the set of IDs could then be obtained from the canonical dataset. In other words, the query can be rewritten to find the IDs associated with a field value using a projection, in order to join the results to the canonical dataset which is IDs to full record. In many cases, this approach would make it very fast to retrieve the set of IDs, which would also make it very fast to retrieve the set of full records. This process is further described herein as "data enrichment."

In some embodiments, the database system may utilize advanced projection selection strategies for selecting the relevant projection to use for a query. For example, if there are two projections that are equally up-to-date (e.g., they both contain an equal proportion of the canonical dataset), the database system may choose between the two projections based purely on which projection is more selective. For instance, with regard to selection of the best projection for a particular query (e.g., select all the rows with a value greater than 100), there may be a projection in which the rows are already sorted by this value. It would be reasonable to assume that this is a good projection to use for processing the query. However, if there is another projection which only contains rows where the values are greater than 100, it might be even better to use that projection instead.

As another example, between a projection that is more selective but more out-of-date and a projection that is less selective but more up-to-date, the database system may be configured to prefer the projection that is more up-to-date but a little less selective. Although from first glance it may seem that this projection may provide query performance that is a little bit slower (as opposed to the maximally selective projection), the results could be better (because they will be up-to-date) or the query performance may actually be better—because it may be slower to have to fully update the query on the maximally selective projection (e.g., because proportionally more of the un-optimized buffer has to be read).

In some embodiments, the database system may be able to automatically generate new kinds of projections for a canonical database based on the queries it receives. In other words, the database system may be able to analyze the kinds of queries being performed in order to pick new projections to make that would improve the performance of similar queries. For example, if the database system receives ten queries in a row that involve a particular aggregation with different kinds of GroupBys but always a GroupBy in the same column, the database system may pre-aggregate that column in a projection.

In some embodiments, the database system may comprise a query rewriter that rewrites the queries of the user to query from the canonical dataset, the temporary buffer, and/or the projection dataset(s) in a manner that would provide the best query performance for each query of the user. The query rewriter may identify and select projection dataset(s) that best fit the query based on various factors such as data sort order, data format, data aggregation (e.g., rollup), data fields, timestamps, among other factors pertaining to the data of the projection dataset(s). The canonical dataset and projection dataset(s) may be versioned to bookmark the state of the data of the canonical dataset and projection dataset(s) at various points in time. In this way, the query rewriter may effectively best fit the query based on the canonical dataset and/or projection dataset(s) best fit version. The query rewriter draws relationships between the various versions and/or factors of the canonical dataset, the temporary buffer, and/or the projection dataset(s) to best update the query.

Thus, the purpose of the query rewriter may be to: (1) analyze the query; (2) identify and select the best projection dataset(s) that fits the query (e.g., the best ordered sort, field sort, etc. dataset); (3) optionally identify and select the best version(s) of the canonical dataset and/or projection dataset(s) that fits the query (e.g., the best immutable version dataset from a version history ordered sequentially from oldest revision to latest revision); and (4) rewrite the query based on the results of actions (2) and/or (3). The buffer may be combined or joined with the selected projection dataset to provide the projection dataset with the most up-to-date data chunk(s). After combining or joining, the query may be executed on the combined or joined projection dataset.

In some embodiments, incoming data chunks may be added to the projection datasets in order to incrementally update the projection datasets. The process of incrementally updating projection datasets can be performed asynchronously. In some embodiments, the process of generating or incrementally updating a projection may include compaction, which can be performed periodically. For example, for a brief period of time the projection dataset(s) may stop being projected and specific chunks (e.g., partial compactions) and/or all of the data in the projection dataset(s) may be compacted. In other words, chunks of data that have been appended to each other in the projection dataset(s) may be compacted into one bigger chunk of data. Such compactions may occur periodically and ideally lead to a global sort of the projections in the projection dataset(s). As each incoming data chunk is appended to the projection dataset, there is essentially a local sort within each data chunk and there would not be a global sort until compaction occurs. Thus the compaction scheme is generally (1) reading some number of data chunks, (2) compacting a selected number of data chunks to one bigger data chunk, (3) performing a global sort on the bigger data chunk.

In some embodiments, compaction may allow for achieving a better overall ordering in the projection dataset. It may involve periodically looking at many data chunks together and effectively reordering them. It could be all the data chunks in the projection dataset (e.g., a global sort), or it could be only a portion of the projection dataset (e.g., a sort performed on a larger scale than a local sort of a single data chunk). In practice, it may be difficult to perform a true global sort of the entire projection dataset because new chunks of data are constantly being received by the database system that have to be appended to the projection dataset. Thus, compaction may involve reading some number of chunks, performing a sort across those chunks, and then writing out the result to the projection dataset. With enough compaction over time, the projection dataset(s) may effectively converge on a global sort.

The process of incrementally updating and compacting projection datasets can be performed asynchronously. The database system may process projections in the background by taking all the accrued data and files associated with the projection and the tail of the buffer, performing a sort over all that data, and then saving that data in a more compact and contiguous form. The database system may not need to perform compactions at the scale of the entire dataset. In some embodiments, the database system may be able to perform partial compactions as well by taking individual chunks of the data and re-optimizing them as necessary without having to wait until the whole projected dataset is in a bad state.

In some embodiments, projections may be asynchronously processed (e.g., updated) as resources become available to the database system. Thus, there is potential for projections to become out of sync with one another if the database system is resource constrained and there are not enough resources to process all the projections to bring them all up to date. In some embodiments, the database system may be able to prioritize the processing of certain projections. For example, one projection may be more important than another projection for the same dataset, and thus, the more important projection will always be processed and brought up to date first.

The chunks of the incoming streaming data may be tracked as "transactions" in the canonical dataset, buffer, and/or projection dataset(s) (e.g., a transaction in the projection dataset may correspond with a most up-to-date chunk in the projection dataset). By using the canonical dataset, the temporary buffer, the projection dataset(s), and the query rewriter, query performance and various query searching, such as needle-in-haystack and hay-in-haystack queries, may be improved on a petabyte scale. To reiterate, the database system may include (1) a buffer, (2) a canonical dataset, (3) projection dataset(s) comprised of projection(s) from the buffer and/or canonical dataset, and (4) a query rewriter.

The projections namely order the data and/or change the sort order of the buffer and/or canonical dataset, to make the data more efficient and convenient to query. Multiple projections can be partially queried to process a query. For example, to process a query, the database system may select the most efficient projections (e.g., two examples may be sort by field and sort by ID), and join the partial query results of the most efficient projections as a filter on the canonical dataset (e.g., a data enrichment from the canonical dataset sorted by field and by ID is achieved). The projections may be selected and sorted based on various projection rules that are catered towards performance and efficiency of the query (e.g., the underlying projection that will best serve the query).

In some embodiments, the database system may allow users of a dataset to declare columns in the dataset as "friends" (e.g., create a relationship between columns), so that sorting one of these columns implies that the other related column is at least in part sorted. These relationships can be used in the determination of which projections to select for a query. As an example, a date column and a timestamp column can be related if the dates are somehow derived from timestamps. Thus, if a projection is sorted by time stamp and a query involves filtering on date, the projection could still be used. In some embodiments, the database system may be configured to automatically infer relationships between columns and declare columns in the dataset as friends.

In some embodiments, the database system may comprise a decoupled compute layer and storage layer. Splitting the storage layer from the compute layer allows the database system to be independently scaled based on the amount of data a user wishes to process and also how much the user wishes to query the data. As users query the dataset, the database system can scale up the query processing without having to scale up the dataset processing (e.g., generation or incremental updates of projection datasets, compaction, etc.) at the same time. However, if it is desirable for projections to be generated and updated faster, the database system can then scale up the dataset processing resources accordingly to update projections faster and more often (with compaction reducing the impact of projecting more often). Furthermore, the compaction process can also be adjusted based on available resources. In some embodiments, for each new set or batch of updates that is to be applied to the canonical dataset, the storage layer may generate a projection by converting the set of updates into a format that is convenient to query. Furthermore, the number of projections can be scaled with resource availability.

This approach is quite different from a typical database, in which those parameters are dependent on one another because any additional indexes or projections would have to physically reside on the storage of the database system. Furthermore, coupled database systems must maintain and balance a number of factors together that may lower the performance of the database system as a whole due to the coupling. Such joint factors may include keeping the computing nodes up, balancing disk compression, maintaining proper storage, and so forth. Furthermore, by decoupling the compute layer and storage layer, the database system may save resources. For example, with a decoupled compute layer and storage layer, the compute layer may be in a state of quiescence if there are no queries (e.g., nothing is running on the stack), such that no compute resources need to be allocated (and thus, are preserved). In contrast, a coupled database system would not be able to spin down computing nodes since they are pinned to the storage layer.

Advantageously, the database system contemplated herein provides minimal latency for user's queries via alternative data copy means and automatic selection of such data. The queries are efficiently executed and fulfilled through a combination of the buffer, projection dataset(s), the canonical dataset and the query rewriter. Accordingly, the database system and automatic selection processes of the database system enables users to execute fast best fit queries over petabytes of data with speed-of-thought latencies.

Thus, when the database system receives a query associated with the canonical dataset, the processing of the query may include two distinct functions or jobs. A first job may involve determining all of the various projections that are available and configured for the canonical dataset and then determining which of those projections is most-relevant and should be the best for processing the query (e.g., the projection is a sorting or subset or some transformation of the actual data that would provide faster query processing for this query). However, that projection may not be fully up-to-date, so in addition to querying that projection, a subset of the buffer with newer data can be queried and joined. Thus, a second job may involve determining whether the data contained in the selected projection is up-to-date and how far up-to-date it is, which is enabled by the use of an immutable, versioned database system. If the selected projection is not completely up-to-date, then it can be supplemented with more recent data from the buffer in order to obtain an up-to-date or "current" view of the data. Although querying the entire buffer may be really poor for performance, querying the last little segment of the buffer (e.g., data not in the projection) may be reasonably effective and cheap. As a potential third job, the query results may be supplemented (e.g., enriched) with data found in the canonical dataset.

The second job is necessary because during operation of the database system, new chunks of data may continually be streaming in and being added to the buffer. Users that send queries may have the expectation of the search encompassing the most up-to-date data (e.g., including recent entries added to the buffer but not yet added into the projection datasets). Thus, the selected projection for processing a query can be supplemented with more-recent data from the buffer to obtain a "current" view. This can be performed as long as the incoming data records being added to the buffer have some notion of ordering, thereby allowing the buffer to be queried and mixed in with the results from querying the projection.

As a more concrete example of this, assume there are a total of 10,000 records in the buffer at time t=0, a chunk of new records arrives to increase the total to 11,000 records in the buffer at t=2, then subsequently a chunk of new records arrives to increase the total to 12,000 records in the buffer at t=4, and so forth. Furthermore, assume that a projected form of the dataset can be created or updated at the half steps (e.g., based on the records in the buffer at that instant in time). So at time t=1, a projected form of the dataset can be created using the records in the buffer at t=0, then at time t=3, the additional chunk of 1000 records added to the buffer (at t=2) would be added to the projection, and so forth.

If the database system receives a query at time t=2, the "current" view of all the data would encompass 11,000 records (e.g., all the records cumulatively received by the database system). However, at that moment in time, the projection dataset is not up-to-date since it only includes the data for the t=0 case (e.g., 10,000 records). Instead of simply querying the buffer for all 11,000 records (which would be slow), the database system seeks to rely on the better-formatted projection dataset as much as possible by taking the projection dataset and mixing in query results of the buffer for the 1,000 records that showed up between t=1 and t=2. This is made possible by having a versioned data system and a query rewriter that configured to execute the query on a combination of the indexed data in the projection dataset supplemented and the relevant portion of data from the buffer. In some embodiments, the query rewriter may rewrite the query into two separate queries of the projection and the portion of the buffer log, and then combining the results of those two separate queries.

Also, assuming that the buffer is ordered (e.g., based on time), then every so often the database system can incrementally update a projection dataset to bring it up-to-date. This can be done by taking the latest entries in the buffer (e.g., anything that has shown up in the buffer but has not yet been sorted and added to the projection dataset), sorting those entries, and then stashing them into the projection dataset. In some embodiments, there may be an index for the projection that is batch updated in the same way that the buffer is batch updated. Thus, as a new chunk of data arrives and is added to the buffer (ordered by timestamps), that chunk of data will be further sorted/processed and then incrementally added to the projected dataset (with some latency due to batch processing). How the chunk of data is sorted/processed for incremental addition to the projected dataset will depend on the particular configuration of that projected dataset; data in the projected dataset may be ordered on any basis (e.g., other than time) that would make querying or data compression better. The structure of the data can be used to determine how to effectively organize that data to dramatically improve query performance.

In some embodiments, there may be a frontier of "currentness" or "up-to-dateness", with the canonical dataset leading this frontier. For any version of the canonical dataset, the database system will know the versions of the projection datasets that correspond to it. The database system may split the query up based on that information—e.g., to query as much data from projection datasets as possible. In some embodiments, the database system may keep track of the correspondence between transactions of the canonical dataset and transactions of the projection datasets (associated with the canonical dataset). The database system may also keep track of the frontier for the canonical dataset and for each associated projection dataset (e.g., the corresponding transaction for that projection dataset which would bring that projection dataset up-to-date with the canonical dataset transaction). For example, when a chunk of new data is received and added to the buffer, the canonical dataset may be incrementally updated by appending the chunk of new data to the canonical dataset. The addition of this entire chunk of data to the canonical dataset may be considered a single transaction. Each time this happens, a sorted version of that chunk of data may be appended to each associated projection dataset in order to bring the projection datasets up to date. However, there may be a large amount of data in the chunk, which can make it difficult to sort and process all at once. Thus, in some embodiments, the chunk of data may be divided up for processing as part of multiple transactions for the projection dataset. For example, if the chunk involved thirty days of data, that may be too much data to sort and process all at once. Instead, the chunk could be divided up so that one day of data at a time is processed and added to the projection dataset (e.g., thirty separate transactions for the projection dataset).

However, until the entire chunk or transaction for the canonical dataset (e.g., all thirty days' worth of data) has been processed and added to a projection dataset, that projection dataset may not be used for processing a query. Instead, an earlier version of the projection dataset (e.g., without any of the new data) may be used and supplemented with new data from the buffer. Alternatively, the canonical dataset could be used for processing the query, although it would be slower. After enough time, all the projection datasets associated with the canonical dataset will have been brought up-to-date with that canonical dataset transaction. There can be many canonical dataset transactions (e.g., chunks of incoming streaming data) that are added to the projection datasets without impacting the ability of the database system to keep track of how up-to-date each projection dataset is.

When assessing a projection dataset for processing a query, the database system may be able to traverse backwards in history until reaching a label on a canonical dataset transaction which indicates that the projection dataset is updated to that point in time. The database system may also be able to pick an arbitrarily older frontier. For instance, the database system may be able to look at the data as it was four days ago (e.g., if newer data is not relevant to the query) and just query all the older versions of the datasets that are still kept around. The database system may use this information to avoid datasets which are guaranteed to not contain the data being requested in the query. Thus, older versions of datasets can be kept around and used for processing a query as long as they are supplemented with newer data (which can be easy to implement if data is ordered by time in the canonical dataset and/or the buffer), and the database system may keep track of how up-to-date each version of each projection dataset is. In this manner, the database system can continue to serve queries against previous, uncompacted projected datasets until they are brought up-to-date.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtensible markup language (XML) files, TeXT (TXT) files, flat files, spreadsheet files, and/or any other widely used or proprietary format for data storage. Databases are typically the structured set of datasets stored and accessed electronically from a computer system such as a data store. Accordingly, each database referred to herein (e.g., in the description herein and/or the figures of the present application) is to be understood as being stored in one or more data stores.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Table: An arrangement of data in columns and rows. A collection of related data or data elements (e.g., values) can be stored across cells located where the rows and columns intersect. The collection of data elements may be stored as tabular data, which structures the data into rows, with each row containing the same number of cells (although some of these cells may be empty). A table may be used to structure data in a dataset. In some implementations, a table may be multi-dimensional.

Dataset: A specific collection of bytes/tabular data. The specific collection of bytes/tabular data may also include the table(s) that contain, order, and constrain the bytes/tabular data as well as the relationships between the tables.

Edits: Write operations that include additions, modifications, deletions, cell mutations, appends, insertions, among other related dataset write operations.

Transaction: A set of edits or updates to be made to the dataset that is received by the database system.

Canonical Dataset: Generally, a dataset that contains a set of "original" or "initial" data (e.g., historical data), which is usually compiled and/or updated using batch updates. The canonical dataset may be optimal for reading large quantities of data but suboptimal for fast writes over time.

Edits dataset: Generally, a set of data that contains edits (e.g., cell mutations, row appends and/or row deletions) that are applicable to the set of data in the canonical dataset. The edits dataset may grow over time as edits are flushed from the buffer and appended to the edits dataset.

Buffer: A write ahead log for providing atomicity and durability for a database. User-requested edits are first recorded in the buffer. The edits are then periodically or intermittently appended to the edits dataset after either a certain amount of time has passed and/or a certain volume of edits has occurred and are then flushed from the buffer. The buffer is optimal for fast writes but suboptimal for reads over time.

Projection Dataset, Projected Dataset, Projection: An index or copy of a canonical dataset, an edits dataset, and/or a buffer that may have, for instance, single or multiple column sort-orders and/or particular data formats. The projection dataset may be partial, in that, the projection dataset does not have to include all of the original columns from the canonical dataset, the edits dataset, and/or the buffer.

Query rewriter: An aspect of the database system that transforms the original query to a new query which produces the same query results but executes with better performance. The query rewriter may rewrite the original query into a new query having multiple portions that can be executed across different datasets. The function of the query rewriter may include identifying and selecting the best projection dataset(s) for a particular query.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Database System Environment

FIG. 1 illustrates an example block diagram of a database system environment 100, according to some embodiments of the present disclosure. In the embodiments of FIGS. 2A-2E, a database system 150 can be similar to, overlap with, and/or be used in conjunction with the computing database system 150 of FIG. 1. For example, the database system 150 of FIG. 2A can include buffer 158, projection dataset I 154A, projection dataset II 154B, and canonical dataset 156, which may be similar to the database system 150 in the database system environment 100 of FIG. 1. However, the database environment 100 can also include a data streaming service 155, query rewriter 153, additional projection datasets 154, among other features as shown in the database system environment 100 of FIG. 1.

The example database system 150 includes one or more applications such as a query rewriter 153, one or more services such as a data streaming service 155, one or more initial datasets such as projections dataset(s) 154, a canonical dataset 156 and a buffer 158, and one or more data transformation processes as highlighted in FIGS. 2A-2E. Further, the database system 150 includes a decoupled compute layer 151 and storage layer 152 to save and better manage resources. In this way the decoupled database system may scale by the amount of data a user wants to process as well as how much a user wants to be able query, independently. Additionally for the decoupled database system 150 the compute layer 151 may be in a state of quiescence where if nothing is running on the stack, then no compute resources need to be allocated, and thus resources are preserved. The compute layer 151 includes one or more processor(s) 170, memory 180, a query rewriter 153, and a data streaming service 155. The storage layer includes one or more projection dataset(s) 154, a canonical dataset 156 and a buffer 158. In some embodiments, the buffer 158 may be a write ahead log that provides atomicity and durability for the database system 150.

The example database system 150 can include a data pipeline system. The database system 150 can transform data and record the data transformations. The one or more applications can include applications that enable users to view datasets, interact with datasets, filter datasets, and/or configure dataset transformation processes or builds. The one or more services can include services that can trigger the data transformation builds and API services for receiving and transmitting data. The applications and services can access network 120 to communicate with one or more data source(s) 110 or one or more user device(s) 160. The user device(s) 160 also includes a user interface 162 to allow the user to visually query, view, interact with, filter, and/or configure the projection dataset(s) 154, canonical dataset 156 and buffer 158. The one or more initial datasets 154, 156 and buffer 158 can be automatically retrieved from external sources such as from data source(s) 110 and/or can be manually imported by a user such as from user device(s) 160. The one or more initial datasets 154, 156 and buffer 158 can be in many different formats such as a tabular data format (SQL, delimited, or a spreadsheet data format), a data log format (such as network logs), or time series data (such as sensor data).

The database system 150, via the one or more services, can apply data transformation processes. Example data transformation processes are shown in FIGS. 2A-2E. The database system 150 can receive one or more initial datasets 154, 156 and buffer 158. The database system 150 can apply a transformation to the datasets 154, 156 and buffer 158. For example, the database system 150 can apply a first transformation to the initial projection datasets 154, which can include combining the projection datasets 154 with the buffer 158 (such as or similar to a SQL MERGE), joining the projection datasets 154 with the buffer 158 (such as or similar to a SQL JOIN), and/or a filtering of the projection datasets 154. The output of the first transformation can include a modified dataset. A second transformation of the modified dataset can result in an output dataset, such as a report, combined dataset, compacted dataset, global sorted dataset or a joined table in a tabular data format that can be stored in the database system 150. Each of the steps in the example data transformation processes can be recorded and/or stored by the database system 150 and made available as a resource, for example to one or more user devices 160. For example, a resource can include a dataset and/or a dataset item, a transformation, or any other step in a data transformation process. As mentioned above, the data transformation process or build can be triggered by the database system 150, where example triggers can include nightly build processes, detected events, manual triggers by a user via a user device 160 or periodic batch updated data from data source(s) 110. Additional aspects of data transformations of the projection dataset(s) 154, the canonical dataset 156, the buffer 158 and the database system 150 are described in further detail below.

The techniques for recording and transforming data in the database system 150 may include maintaining an immutable history of data recording and transformation actions such as uploading a new dataset version to the database system 150 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable datasets. More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset. As a simple example, a version identifier of '1' may be recorded in the catalog for an initial dataset item of a dataset. If data is later added to the dataset, a version identifier of '2' may be recorded in the catalog for a second dataset item that conceptually includes the data of the initial dataset item and the added data. In this example, dataset item '2' may represent the current dataset version and is ordered after dataset item '1'.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (i.e., pre-existing versions of the dataset) are preserved when a new dataset item is added to the dataset (i.e., when a new version of the dataset is created). Note that supporting immutable datasets is not inconsistent with pruning or deleting dataset items corresponding to old dataset versions.

For example, old dataset items may be deleted from the system to conserve data storage space.

A version of the dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (e.g., a new dataset item of the dataset) without deleting, removing, or modifying pre-existing dataset items (e.g., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In a preferred embodiment, the dataset version corresponds an identifier assigned to the transaction that created the dataset version. The dataset item may be associated in the catalog with the set of files that contain the data of the dataset item. In a preferred embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (e.g., different dataset items) of the datasets. In association with information identifying a particular version (e.g., a particular dataset item) of a dataset, there may be information identifying one or more files that contain the data of the particular dataset version (e.g., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the database system 150 multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance tracking extends beyond transaction level granularity to column level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and Transaction 2." Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset(s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The database system 150 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The database system 150 may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the database system 150 to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

Database System Environment Example

FIGS. 2A-2E illustrates an example of the database system environment to provide a framework of the specific systems, components, and methods described herein. This description is provided for the purpose of providing an example and is not intended to limit the techniques to the example database system, the example datasets, the example data chunks or the example data.

Figure 2A:
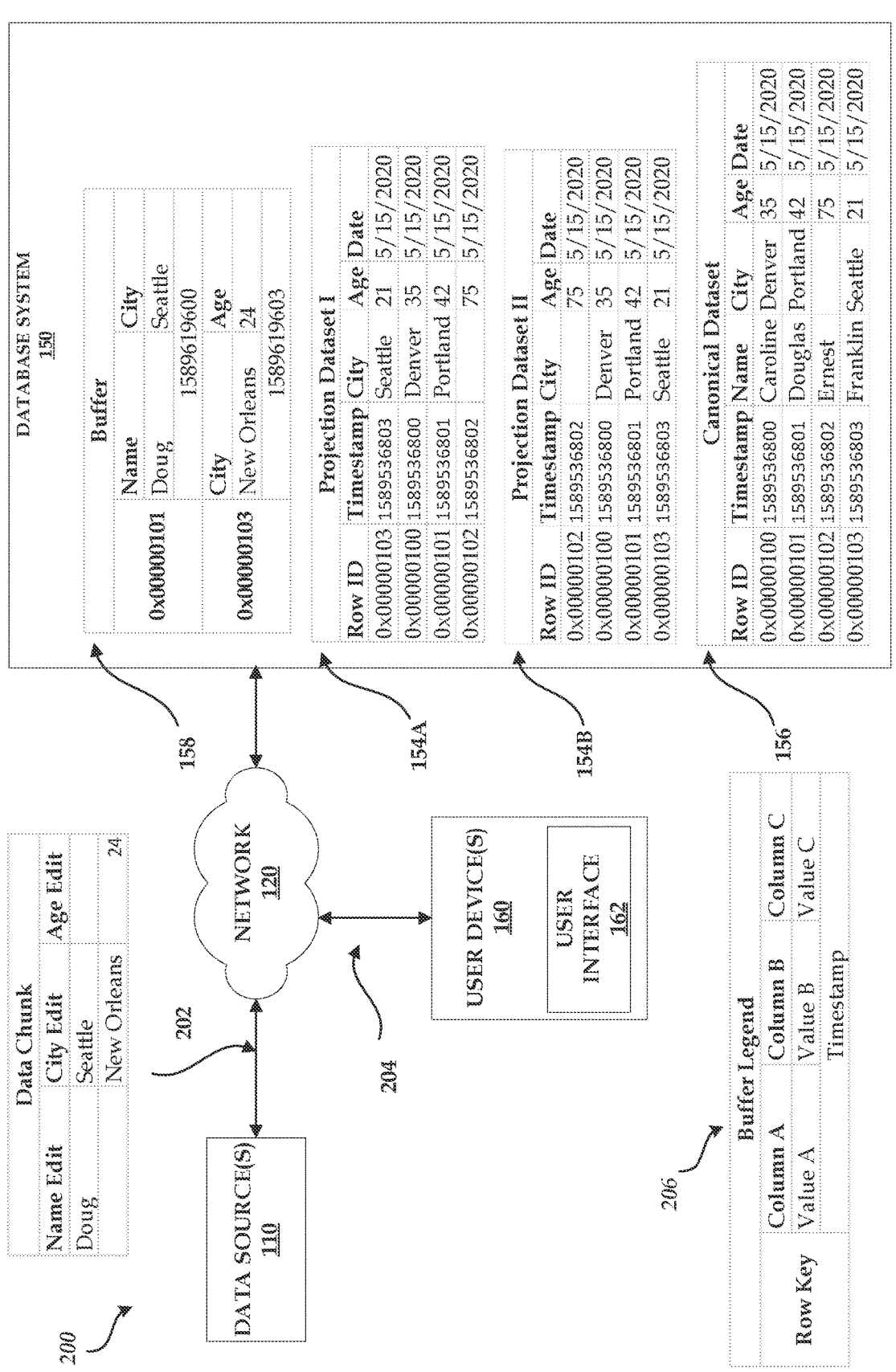
FIG. 2A is a block diagram illustrating an example of the database system environment, according to some embodiments of the present disclosure.

FIG. 2A illustrates an example database system environment 200. In the example database system environment 200, the database system 150 may receive batches of data chunks over a network 120 that are sent from data source(s) 110 and/or user device(s) 160 via data streaming service 155. Various datasets within the database system 150 may be batch updated (e.g., for each batch of data chunks that is received). In some embodiments, the data chunks may be defined by one or more object types, each of which may be associated with one or more property types. At the highest level of abstraction, each data chunk contains at least one data object, where the data object is a container for information representing things in the world. For example, a data object can represent an entity such as a person, a place, an organization, a market instrument, or other noun. A data object can also represent an event that happens at a point in time or for a duration. Additionally a data object can represent a document or other unstructured data source such as an e-mail message, a news report, or a written paper or article. Each data object is associated with a unique identifier that uniquely identifies that particular data object within the database system 150.

Different types of data objects may have different property types. For example, a "Person" data object might have an "Eye Color" property type and an "Event" data object might have a "Date" property type. Each property as represented by data in the database system 150 may have a property type.

Objects may be instantiated in the database system 150 in accordance with the corresponding object definition for the particular object. For example, a specific monetary payment (e.g., an object of type "event") of US $30.00 (e.g., a property of type "currency") taking place on Mar. 27, 2009 (e.g., a property of type "date") may be stored in the database system 150 as an event object with associated currency and date properties. The data objects may support property multiplicity. In particular, a data object may be allowed to have more than one property of the same property type. For example, a "Person" data object might have multiple "Address" properties or multiple "Name" properties.

The buffer 158, canonical dataset 156, and projection dataset(s) 154 contain specific collections of incoming data chunks. The buffer 158, canonical dataset 156 and projection dataset(s) 154 are represented as tabular data in FIGS. 2A-2E, however this is not meant to be limiting and the data may be represented in other non-tabular ways (e.g., tuple store, multivalue, or objectlink)

The buffer 158 initially stores each incoming data chunk before combining with the canonical dataset 156 and/or projection dataset(s) 154A, 154B. In the example database system environment 200, the buffer 158 stores the data chunk containing two rows of data (e.g., row 1: Doug, Seattle, null; row 2: null, New Orleans, 24) with three columns (e.g., name edit, city edit, and age edit). The buffer 158 is a columnar store buffer in which there is a row key, column, value, and timestamp for each row. The breakdown of each buffer 158 element is further illustrated via the sample buffer legend 206.

The canonical dataset 156 is a set of batch updated data that makes up the main, underlying, full dataset. In the example database system environment 200, the canonical dataset 156 stores historical data containing four rows of data (e.g., row 1: 0x00000100, 1589536800, Caroline, Denver; 35, May 15, 2020) with six columns (e.g., Row ID, Timestamp, Name, City, Age and Date).

The projection datasets (e.g., projection dataset I 154A and projection dataset II 154B) are indexes of the canonical dataset 156 and/or the buffer 158 that may have, for instance, single or multiple column sort-orders and/or particular data formats. The projection dataset may be partial, in that, the projection datasets do not have to include all of the original columns from the canonical dataset 156 and/or the buffer 158. In the example database system environment 200, the projection dataset I 154A is an index of the canonical dataset 156 sorted by age from youngest to oldest. The projection dataset II 154B is an index of the canonical dataset 156 sorted by city alphabetically.

In FIGS. 2B-2E, various transformation and selection methods associated with the database system 150 are shown, with attention to certain components of the database system

150 including the buffer 158, projection datasets (e.g., projection dataset I 154A and projection dataset II 154B), and canonical dataset 156. Such methods include combining (merging), sorting, compacting, data enriching, joining and selecting.

In some embodiments, there may be relationships (e.g., "friends") between columns of the projection dataset(s) that may additionally inform the selection of a particular projection for processing a query. These column relationships can be explicitly defined (e.g., user-provided) or implicit (e.g., inferred or determined by the database system 150 through a set of rules or a machine learning algorithm). These column relationships can be defined at a high-level for the canonical dataset and there can be an inheritance relationship between the canonical dataset and its projection dataset(s) for these column relationships. For columns that are "friends" with one another, there may be a relationship, association, or derivation between the data of those columns. As a result of the relationship, association, or derivation, sorting a dataset by one of the "friends" columns may imply that the other "friends" column may also be sorted (at least in part). For example, projection dataset I 154A contains both a date column and a time stamp column, and the date column is at least in part derived from the time stamp column (e.g., each date may have been extracted from a corresponding time stamp). Thus, there may be a "friends" relationship between the date column and time stamp column, and the date column could be considered to be subordinate to, or derived from, the time stamp column. In this case, if the dataset is sorted by the time stamp column, the date column in the sorted dataset would also be sorted as a result.

In some embodiments, each "friend" relationship may represent a connection, relationship, association, or derivation between two columns. In some embodiments, the relationship may be through an event or through matching properties associated with the data between the two columns, and the relationship may be asymmetrical or symmetrical.

In some embodiments, there may be a graphical user interface that allows these "friends" relationships between columns of a dataset to be visualized, along with the various rows and columns of the dataset. In some embodiments, the user interface may allow data objects (e.g., a row in the dataset), the properties associated with each data object, and any relationships between data objects to be visualized. In some embodiments, the user interface may show a graph representation of relationships between the columns or the data objects within a dataset. This user interface could be presented to a user on a user device, such as the user interface 162 operating on user device 160 in FIG. 2A.

The user interface may also allow the user to interact with the data in the dataset and perform various other manipulations. For example, the objects (and the data objects that represent them) within database system 150 may be queried using a query interface (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Advantageously, the present disclosure allows users to interact and analyze electronic data in a more analytically useful way. Graphical user interfaces allow the user to visualize otherwise obscure relationships and patterns between different data objects. The present disclosure allows for greater scalability by allowing greater access and search capabilities regardless of size. Without using the present disclosure, observation and use of such relationships would be virtually impossible given the size and diversity of many users' present databases, (e.g. excel spreadsheets, emails, and word documents).

In some embodiments, the process of generating or incrementally updating a projection dataset may entail the steps of taking all the accrued data and files associated with a projection and any recent data not in the projection (e.g., the tail of a buffer or a canonical dataset), performing a sort over all that data, and then saving that data in a more compact and contiguous form (e.g., compaction). However, it should be noted that the database system 150 may not need to perform sorts and compactions at the scale of the entire dataset; in some embodiments, the database system 150 may be able to perform partial sorts and compactions by taking individual chunks of data in the dataset and re-optimizing them as necessary. In some embodiments, the database system 150 may perform the steps for processing and updating projections in the background as resources become available to the database system 150.

It should also be noted that, for the purposes of clarity and facilitating understanding, the steps of sorting and compacting (involved in incrementally updating a projection dataset) are separate. However, it should be understood that sorting and compacting may be performed together in combination (and often will be). This distinction can be understood by referring to FIG. 2B and FIG. 2C side-by-side. More specifically, FIG. 2B provides insight on how sorting alone could be used to incrementally update a projection dataset, whereas FIG. 2C provides insight on how sorting and compacting can be used together to incrementally update a projection dataset.

Figure 2B:
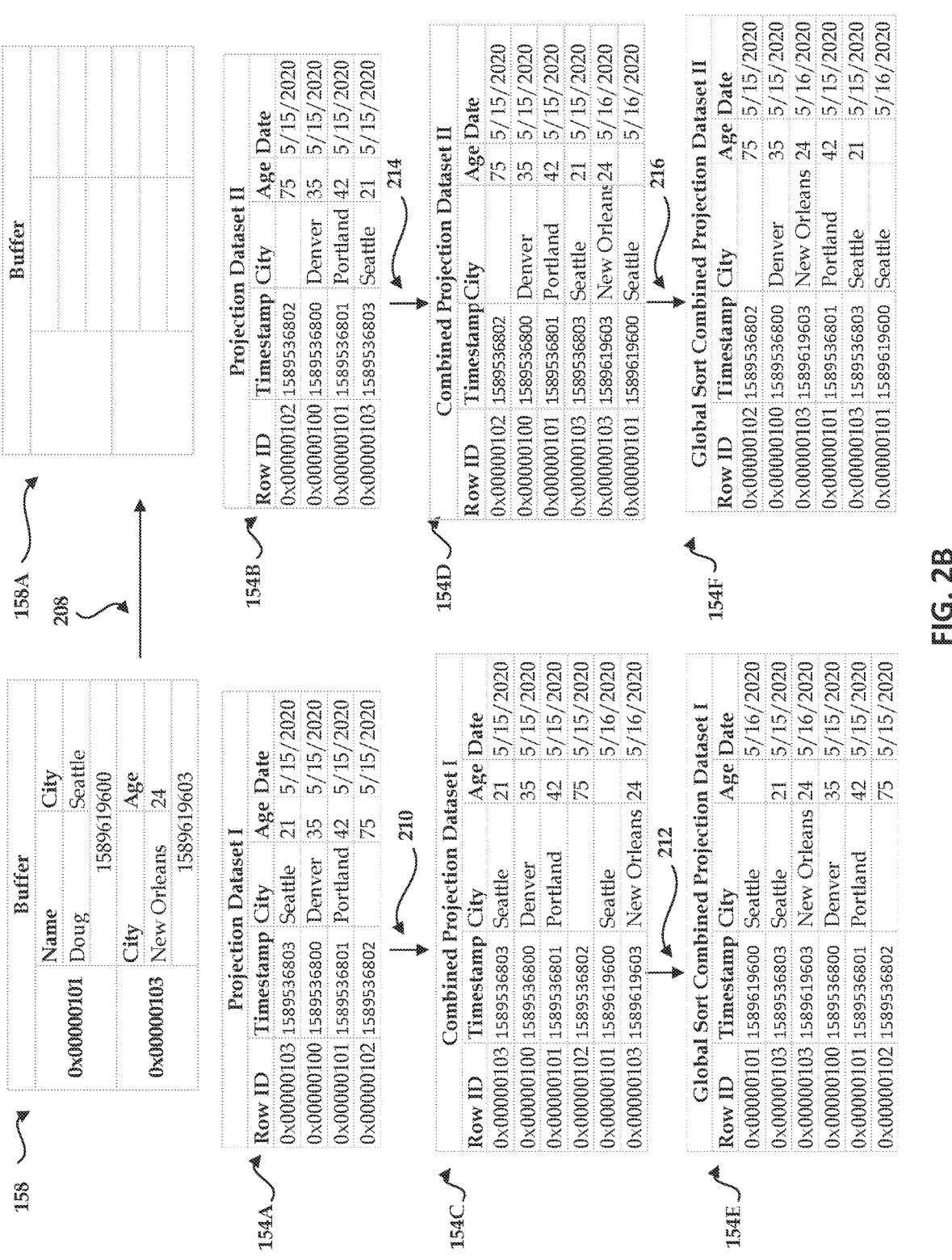
FIG. 2B is a flow diagram illustrating an example global sort workflow of the projection datasets and the buffer of the database system, according to some embodiments of the present disclosure.
Figure 2C:
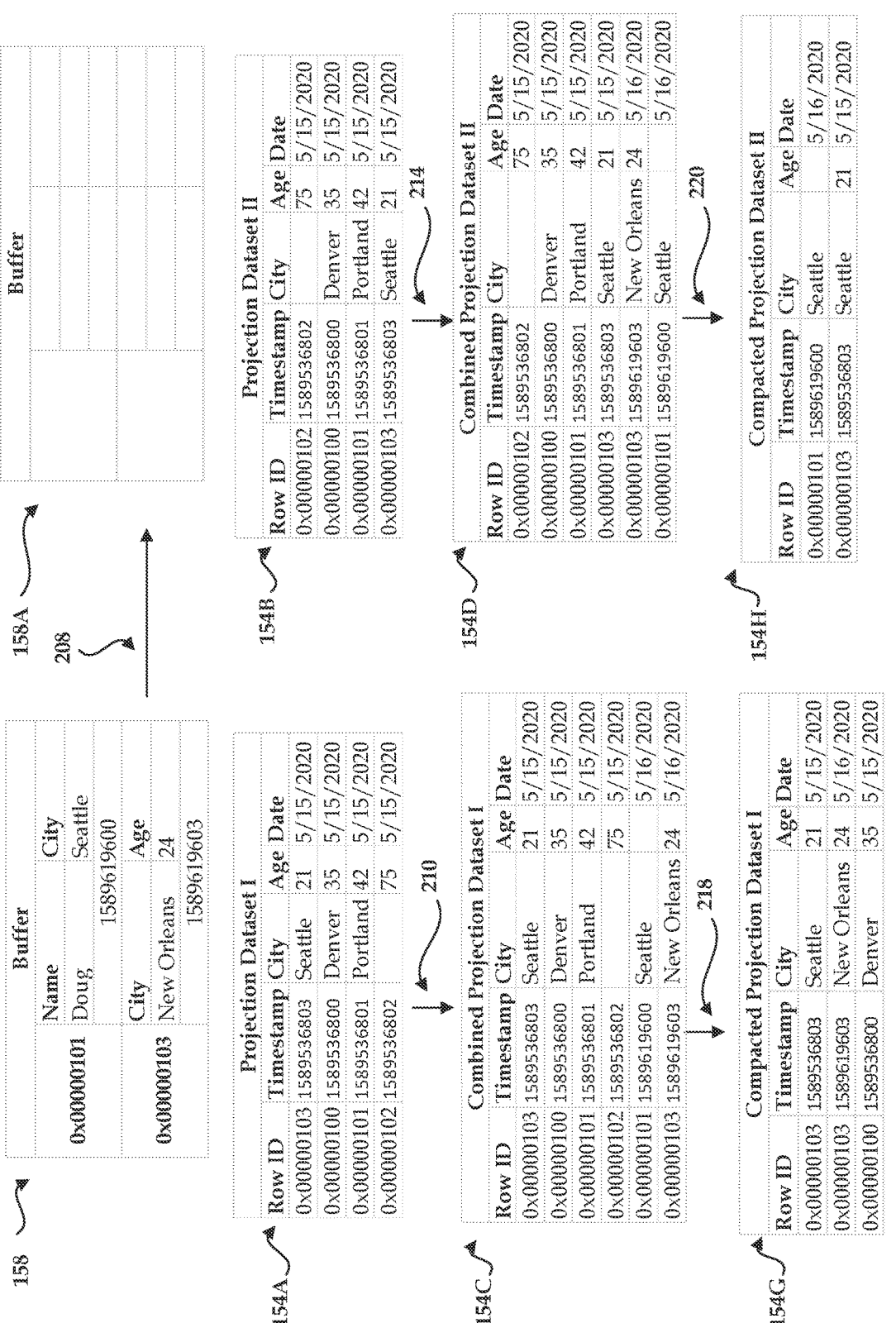
FIG. 2C is a flow diagram illustrating an example compaction workflow of the projection datasets and the buffer of the database system, according to some embodiments of the present disclosure.

Referring now to FIG. 2B, FIG. 2B is a flow diagram illustrating an example global sort workflow associated with projection datasets (e.g., projection dataset I 154A and projection dataset II 154B) and the buffer 158 of the database system 150. It should be noted that the contents of the buffer 158 can also be added to the canonical dataset 156 in a similar process, although that process is not shown in this figure. Projection dataset I 154A and projection dataset II 154B represent sorted subsets of the canonical dataset 156. In this example, projection dataset I 154A is sorted by the age column (youngest to oldest) and projection dataset II 154B is sorted by the city column (in alphabetical order).

At step 210 and 214, the contents of the buffer 158 can be combined with the projection datasets (e.g., projection dataset I 154A and projection dataset II 154B, respectively) to form combined projection datasets (e.g., combined projection dataset I 154C and combined projection dataset II 154D, respectively). In some embodiments, the contents of the buffer 158 can be combined with the projection datasets 154A, 154B by appending the contents of the buffer 158 to the end of the projection datasets 154A, 154B. Steps 210 and 214 can be performed asynchronously based on the resource availability of the database system 150. In some embodiments, the buffer 158 may be flushed periodically or once the contents of the buffer 158 have been appended to all the projection datasets. Flushing the buffer 158 is represented by the illustrated step 208, which results in an empty buffer 158A. However, even though an empty buffer 158A is shown, this is not meant to be limiting—depending on implementation, partial flushing of the buffer may also occur.

In some embodiments, the contents of the buffer may be appended to a projection dataset as an unsorted chunk of data (although the contents of the buffer would be sorted by time, that order may not be the desired order for that projection dataset). As resources become available, the database system 150 may perform an incremental sort on the appended chunk to fit the characteristics of that particular projection dataset. In some embodiments, there may be a set of projection rules associated with each projection dataset that will be applied to sort the contents of the buffer as it is appended to the respective projection dataset. In other words, each projection dataset may be appended with an incrementally sorted chunk of data is based on the characteristics of that projection dataset. This can be done asynchronously, and the database system 150 may sort and append the data chunk to each projection dataset as resources become available.

The projection rules associated with each projection (e.g., defining what data is in the projection and how it is ordered or structured) can also be used in selecting the projections that will best serve the query and provide the best query performance. For example, in FIG. 2B, assume that the projection rules for the projection dataset I 154A dictate that all rows of data records are kept but they are sorted by the age column from youngest to oldest. If a user submits a query that would require a sort or filter on age (e.g., return all data records with age under 40 years, return all data records with age between 20-40, etc.), then the database system can reference the projection rules for all the projections and determine from the projection rules for projection dataset I 154A that the projection dataset I 154A— which has already been pre-sorted by age—may provide the best query performance because the sorting step would not need to be performed. The projection rules for projection dataset I 154A can also be used in incrementally updating the projection dataset I 154A. For instance, it can be seen that the contents of the buffer 158 can be sorted by the age column (youngest to oldest) in accordance with the projection rules for projection dataset I 154A before they are appended to projection dataset I 154A (which is specifically sorted by the age column), in order to obtain the combined projection dataset I 154C.

As another example, assume that the projection rules for the projection dataset II 154B dictate that all rows of data records are kept but they are sorted by the city column in alphabetical order. If a user submits a query that would require a sort or filter on city (e.g., return all data records with Seattle as the city), then the database system can reference the projection rules for all the projections and determine from the projection rules for projection dataset II 154B that the projection dataset II 154B— which has already been pre-sorted by city—may provide the best query performance because the sorting step would not need to be performed. The projection rules for projection dataset II 154B can also be used in incrementally updating the projection dataset I 154B. For instance, it can be seen that the contents of the buffer 158 can be alphabetically sorted by city in accordance with the projection rules for projection dataset II 154B before they are appended to projection dataset II 154B, in order to obtain the combined projection dataset II 154D. In other words, combined projection dataset I 154C displays the newly appended buffer as sorted by age, youngest to oldest (e.g., null, 24) and combined projection dataset II 154D displays the newly appended buffer as sorted by city, alphabetically (e.g., New Orleans, Seattle).

The database system may periodically perform compaction on combined projection datasets—a singular instance of compaction being performed is illustrated by steps 212 and 216 in the figure. Compaction may entail a global sort of a combined projection dataset based on the projection rules associated with that projection dataset, as well as the de-duplication of data records (e.g., based on row ID). For instance, at steps 212 and 216, the combined projection datasets 154C, 154D can be globally sorted based on the projection rules for that particular projection dataset, result-ing in the global sort combined projection dataset I 154E and the global sort combined projection dataset II 154F, respec-tively. In other words, the entire contents of a projection dataset can be sorted from start to finish based on the projection rules for that particular projection dataset.

For example, in FIG. 2B, the combined projection dataset I 154C (with the appended data chunk from the buffer) originated from the projection dataset I 154A, which is associated with projection rules dictating that the rows be sorted by age, from youngest to oldest. However, since the data chunk from the buffer was simply appended to the end of the projection dataset I 154A, the rows of the resulting combined projection dataset I 154C are not all in order by age. At step 212, the database system may perform com-paction, which can involve a global sort across all the rows of the combined projection dataset I 154C, thereby resulting in the global sort combined projection dataset I 154E containing the contents of the combined projection dataset I 154C (with the appended data chunk from the buffer) globally sorted by age, from youngest to oldest.

Similarly, the combined projection dataset II 154D (with the appended data chunk from the buffer) originated from the projection dataset II 154B, which is associated with projection rules dictating that the rows be sorted by city in alphabetical order. However, since the data chunk from the buffer was simply appended to the end of the projection dataset II 154B, the rows of the resulting combined projec-tion dataset II 154D are not all in order by city name. At step 216, the database system may perform compaction, which can involve a global sort across all the rows of the combined projection dataset II 154D, thereby resulting in the global sort combined projection dataset II 154F containing the contents of the combined projection dataset II 154D (with the appended data chunk from the buffer) globally sorted by city name, in alphabetical order. Compaction (e.g., steps 212 and 216) can be done periodically and it can be performed asynchronously in the background; the database system 150 may perform a global sort on a combined projection dataset (which may be only partially sorted) in order to produce a corresponding global sort combined projection dataset start as resources become available to the database system 150.

FIG. 2C is a flow diagram illustrating an example com-paction workflow associated with the projection datasets and the buffer 158 of the database system 150. This compaction workflow is illustrated with the same steps 208, 210, and 214 as depicted in FIG. 2B, along with the same buffer 158, projection datasets 154A, 154B, and combined projection datasets 154C, 154D depicted in FIG. 2B. However, the noted difference of FIG. 2C is that after combining the projection datasets 154A, 154B with the buffer 158 (in steps 210 and 214), the resulting combined projection datasets are compacted and sorted at steps 218 and 220 based on the current projection rules for the respective combined projec-tion dataset.

For example, assume that the combined projection dataset I 154C is associated with projection rules specifying that any rows with an age outside of 20-40 years should be excluded and that the rows should be sorted by age, from youngest to oldest. Under this example, at step 218, the combined projection dataset I 154C— containing the appended data chunk from the buffer 158 (which can be sorted or unsorted)—is compacted down to only the rows with an age between 20-40 years. Those rows can be sorted by age, from youngest to oldest, resulting in the compacted projection dataset I 154G. This compacted projection dataset I 154G may be useful in certain scenarios, such as for processing queries requesting results having an age or age range within 20-40 years.

Similarly, assume that the combined projection dataset II 154D is associated with projection rules specifying that any rows with a city besides Seattle should be excluded and that the rows should be sorted by increasing row ID. At step 220, the combined projection dataset II 154D— containing the appended data chunk from the buffer 158 (which can be sorted or unsorted)—is compacted down to only the rows containing Seattle as the city. Those rows can be alphabeti-cally sorted by city, resulting in the compacted projection dataset II 154H. This compacted projection dataset II 154H may be useful in certain scenarios, such as for processing queries requesting results with Seattle for the city.

It should be noted that the workflows depicted in FIG. 2B and FIG. 2C are generally directed to how projection data-sets can be incrementally updated with the contents of the buffer 158, which is usually added to as new chunks of data are received by the database system 150. For instance, in a streaming data scenario, a chunk of data from a streaming data source can be received by the database system 150 and written to the buffer 158. However, this may not be the only potential source of "new" data associated with a dataset. In some embodiments, data can be imported into the database system 150 to be directly added to the canonical dataset 156. For instance, the canonical dataset 156 may be a compen-dium of historical data that is generated and batch updated through a backfill process, and the projection datasets asso-ciated with the canonical dataset 156 may also be incremen-tally updated with any "new" data added to the canonical dataset 156 through this backfill process.

Figure 2D:
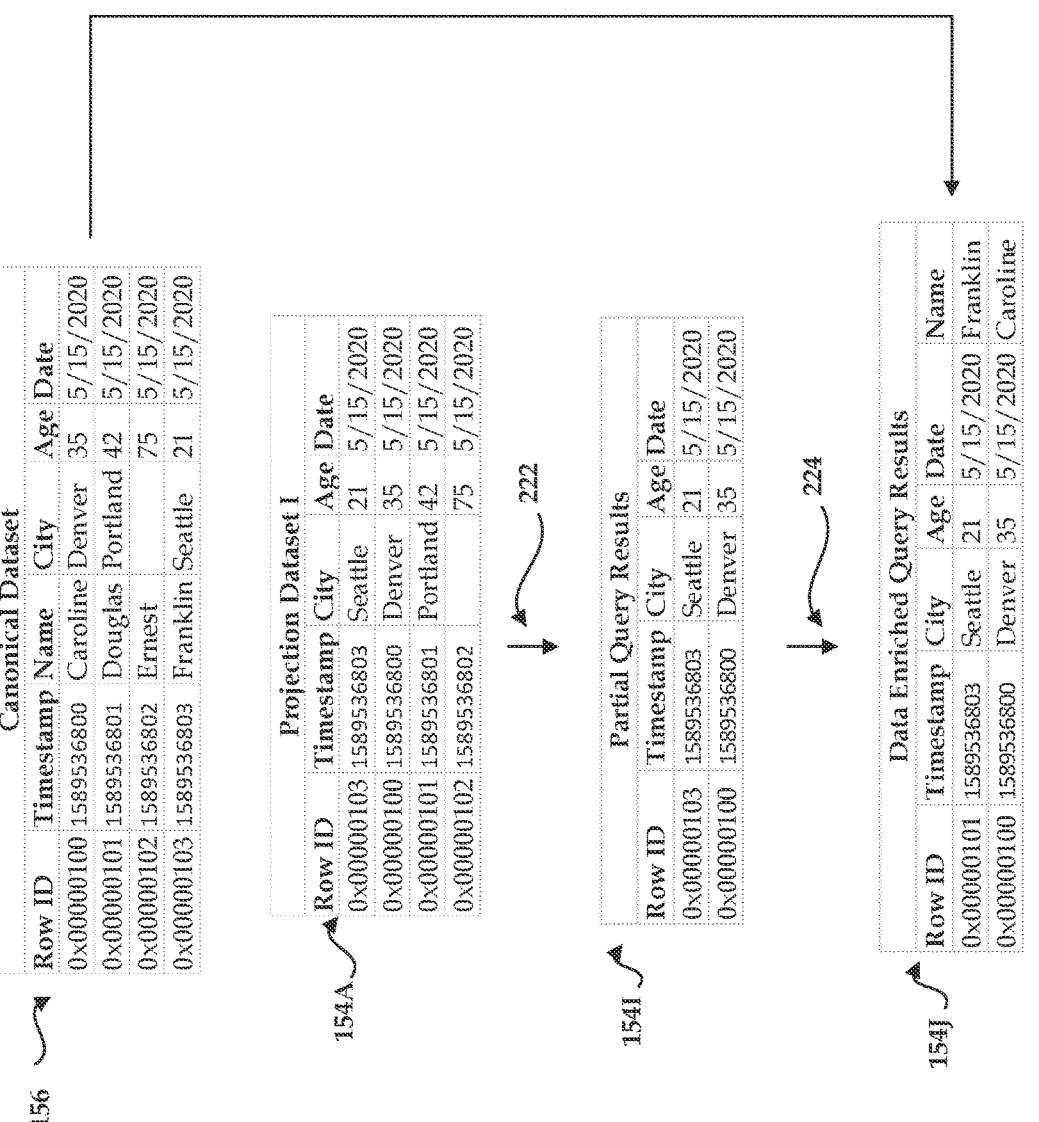
FIG. 2D is a flow diagram illustrating an example data enrichment workflow of the projection datasets and the canonical dataset of the database system, according to some embodiments of the present disclosure.

With respect to FIG. 2D, FIG. 2D is a flow diagram illustrating an example data enrichment workflow for pro-cessing a query and providing query results.

The process of data enrichment may be conceptually thought of as enriching partial query results from one or more projection dataset(s) with data from the canonical dataset in order to efficiently return full query results. For instance, the database system may query a projection dataset for partial query results that are efficient to query the projection for, and then join those partial query results back as a filter on the canonical dataset (e.g., use the row IDs from the partial query results to retrieve additional data from the canonical dataset). In other words, the query can be rewrit-ten to find the row IDs associated with a field value using a projection, and those row IDs can be used to lookup the corresponding full data records in the canonical dataset. In many cases, this approach would make it very fast to retrieve the set of IDs, which would also make it very fast to retrieve the set of full records. This approach can also be used with multiple projection dataset(s). For instance, a query may involve obtaining a first set of row IDs from a first projection and a second set of row IDs can be obtained from a second projection. The shared row IDs between the two sets of row IDs can then be used to lookup the corresponding full data records in the canonical dataset.

In FIG. 2D, assume that the illustrated projection dataset I 154A was generated from the data in the canonical dataset 156 with projection rules dictating the rows are ordered based on increasing age. Furthermore, the projection dataset I 154A does not contain the name column of the canonical dataset 156 (e.g., due to the projection rules or due to the name column of data being added after the projection dataset I 154A was generated).

Further assume that the database system receives a query for which the projection dataset I 154A would provide improved query performance, but the data in projection dataset I 154A alone is incomplete for processing that query. For instance, a user may submit a query for full data records or the names associated with any rows where the age is between 20-40. The projection dataset I 154A, which is pre-sorted by age, is useful for processing queries requesting results having an age range. Thus, depending on what other projection datasets and projection rules there are, the database system may determine that the projection dataset I 154A is the best for processing this particular query.

At step 222, the projection dataset I 154A may be used to determine partial query results 154I for the query. For example, from the projection dataset I 154A, the rows with ages between 20-40 can be quickly determined since the rows are already sorted by age.

In order to provide the full query results, at step 224, the database system can use the row IDs from these partial query results 154I to filter on the canonical dataset 156 or to lookup data from the corresponding row IDs of the canonical dataset 156. For instance, the corresponding names from the name column of the canonical dataset 156 may be added to the rows of the partial query results 154I (e.g., Caroline will be added to the row with the row ID of 0x00000100). The result is the data enriched query results 154I, which can be returned to the user.

Figure 2E:
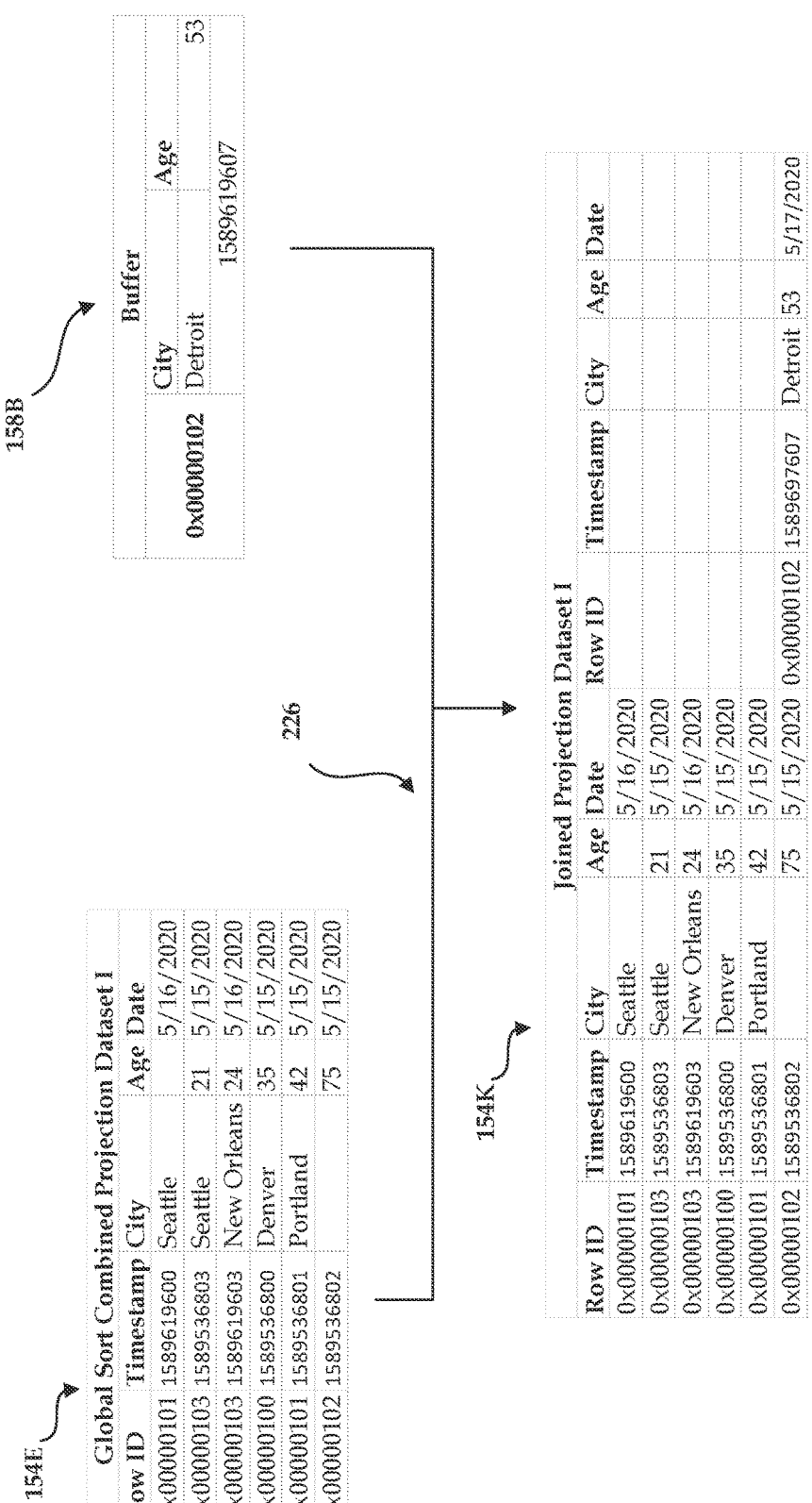
FIG. 2E is a flow diagram illustrating an example join workflow of the projection dataset and the buffer of the database system, according to some embodiments of the present disclosure.

FIG. 2E is a flow diagram illustrating an example join workflow (e.g., left join) of the projection dataset and the buffer of the database system. The global sort combined projection dataset I 154E from FIG. 2B is shown. This workflow may be relevant if, for instance, there is newer data in the buffer 158B (e.g., row edits) that must be joined with the global sort combined projection dataset I 154E in order to provide a "current" view of the data for processing the query. At step 226, the global sort combined projection dataset I 154E is joined (e.g., left joined based on row ID) with the new contents of the updated buffer 158B to obtain the joined projection dataset I 154K. Afterwards, the joined projection dataset I 154K may additionally be transformed, such as being globally sorted, data enriched, or compacted, among other operations, based on the current projection rules for the respective projection dataset.

Although FIGS. 2B-2E display particular workflow transformation operation ordering with specific dataset examples, this is not intended to be limiting. Other combinations and ordering of such transformation operation such as combining, joining, flushing, sorting, globally sorting, compacting, data enriching among other operations may be performed on the canonical dataset 156, projection datasets 154A, 154B and the buffer 158.

Database System Environment Flow Example

Figure 3A:
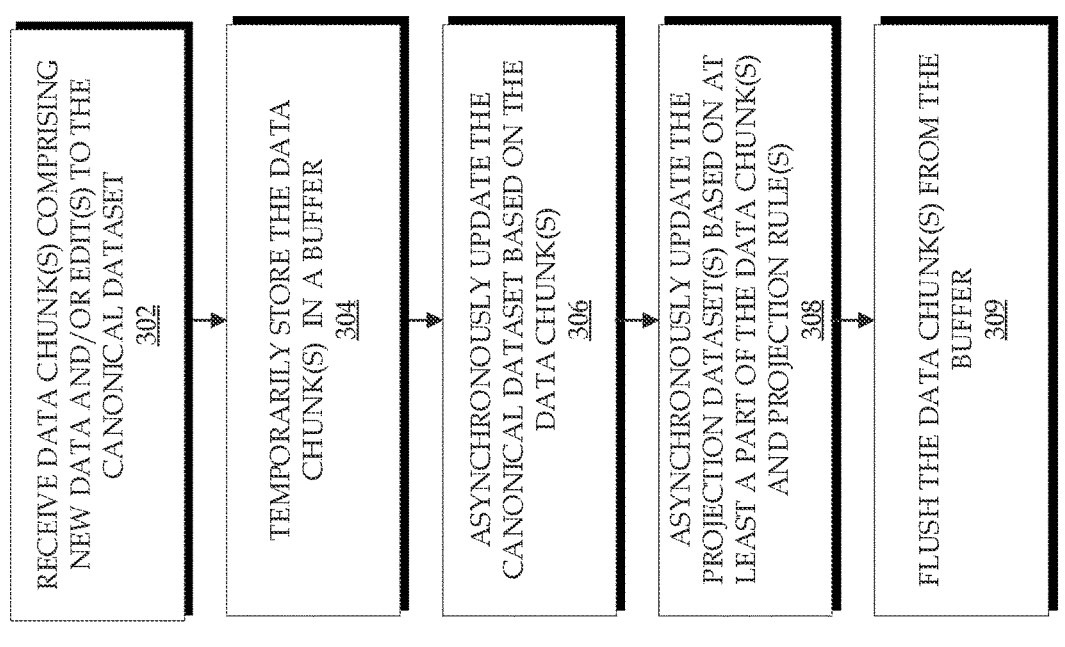
FIG. 3A is an example flow chart for updating the canonical dataset, buffer, and projection datasets.

FIG. 3A is an example flow chart 300 for updating the canonical dataset, buffer, and projection datasets.

At block 302, the database system 150 receives one or more data chunks from a data source 110 and/or user device 160. In some cases, the one or more data chunks may be new data received from a streaming data source, such as via a data streaming service 155, such as to supplement the historical data in the canonical dataset 156. In some cases, the one or more data chunks may be edits provided by a user (e.g., via the user device 160) for making edits to the data in the canonical dataset 156.

At block 304, the database system 150 temporarily stores the one or more data chunks in a buffer 158, which may serve as a write-ahead log. In some embodiments, the one or more data chunks may be stored in the buffer 158 in a chronological order (e.g., in the order that the database system 150 received them).

At block 306, the canonical dataset 156 is asynchronously updated based on the one or more data chunks in the buffer 158. In some embodiments, the one or more data chunks in the buffer 158, which may already be in chronological order, can be appended to the canonical dataset 156. The database system 150 may update the canonical dataset 156 as resources to do so become available to the database system 150 (e.g., asynchronously).

At block 308, the one or more projection datasets 154 (associated with the canonical dataset 156) are asynchronously updated with the one or more data chunks based on the projection rules associated with each of those projection datasets 154. Thus, not all of the data in the one or more data chunks may make it into a particular updated projection dataset. The database system 150 may separately update each of the projection datasets 154 as resources to do so become available to the database system 150 (e.g., asynchronously). In some embodiments, updating one of the projection datasets 154 may comprise steps such as performing a local sort (e.g., of the one or more data chunks), performing a global sort (e.g., of the entire projection data set including the one or more data chunks), and compaction—each of which may be performed asynchronously as resources to do so become available to the database system 150.

At block 309, the data chunks may be flushed from the buffer 158 once they have been added to the datasets. This prevents the contents of the buffer 158, which provides fast writes but slower reads, from becoming too large and unwieldy as that would slow down the read performance of the buffer 158 (e.g., in the future as new data chunks are added to it).

FIG. 3B is an example flow chart 310 of the query workflow with the canonical dataset, query rewriter and projection datasets.

At block 312, the database system 150 receives a query of the canonical dataset 156, such as from a user device 160 and/or data source 110. For example, a user may submit a query through the user interface 162 of an application operating on their user device 160.

At block 314, based on the received query, the database system 150 selects at least one of the projection datasets 154 associated with the canonical dataset 156 for processing the query. The database system 150 may select the at least one projection dataset 154 based on a determination of which projection dataset(s) associated with the canonical dataset 156 should provide the best performance (e.g., fastest query times) for the particular query received at block 312. As a simple example, if the query is requesting results having a particular range of values in a column, the database system 150 may select a projection dataset that has already been pre-sorted by that particular column for processing the query. In some embodiments, the database system 150 may be able to use a projection dataset 154 instead of the canonical dataset 156 by relying on the query rewriter 153 and one or more projection rules. The query rewriter 153 may be able to rewrite the query to instead query the selected projected dataset(s), such that the user would have no knowledge of the re-written query from the user's perspective.

At block 316, the query is executed on the selected projection dataset(s). At block 317, the database system 150 may optionally handle any instances where there are multiple processing steps (e.g., the partial query results from one or more projection datasets are enriched with data from the canonical dataset 156, as described in FIG. 2D, to obtain a full query result) or where partial query results from multiple projection datasets may need to be aggregated (e.g., sum together the number of rows returned from projection A and the number of rows returned from projection B).

At block 318, a full query result may be returned to the user.

FIG. 3C is an example flow chart 320 of the data and query workflow with the canonical dataset 156, query rewriter 153, and projection datasets 154.

At block 322, the database system 150 receives one or more data chunks from a data source 110 and/or user device 160 via data streaming service 155. In some cases, the one or more data chunks may be new data received from a streaming data source, such as via a data streaming service 155, such as to supplement the historical data in the canonical dataset 156. In some cases, the one or more data chunks may be edits provided by a user (e.g., via the user device 160) for making edits to the data in the canonical dataset 156.

At block 324, the database system 150 temporarily stores the one or more data chunks in a buffer 158, which may serve as a write-ahead log. In some embodiments, the one or more data chunks may be stored in the buffer 158 in a chronological order (e.g., in the order that the database system 150 received them).

At block 326, the database system 150 receives a query of the canonical dataset 156, such as from a user device 160. For example, a user may submit a query through the user interface 162 of an application operating on their user device 160.

At block 328, based on the query, the database system 150 selects at least one of the projection datasets 154. For instance, the database system 150 may make a determination of which projection dataset(s) associated with the canonical dataset 156 should provide the best performance (e.g., fastest query times) for the received query. The database system 150 may use the query rewriter 153 and one or more factors in order to rewrite the query to instead query the selected projected dataset(s) rather than from the canonical dataset 156. This can be done purely by the database system 150, such that the user would not need to have any knowledge of the re-written query or the projection datasets 154 from the user's perspective.

In this particular instance, for this particular example associated with FIG. 3C, the contents in the buffer 158 would not have been added to the projection dataset(s) being used to process the query. In other words, the projection dataset(s) have not yet been updated to represent a fully up-to-date view of all the data. In order to ensure that the user's query is processed against a fully up-to-date view of all the data, the projection dataset(s) would have to be supplemented on-the-fly with the contents of the buffer 158 not in the projection dataset(s). Thus, at block 330, the contents of the buffer 158 are combined with each of the selected projection datasets to form combined projection dataset(s) that should represent a "current" or up-to-date view of the data.

In some embodiments, not all of the data in the buffer 158 may be new to the projection dataset(s) and there can be some overlap. Thus, instead of combining the entire contents of the buffer 158 with the projection dataset(s), only the new data would have to be added to the projection dataset(s). This can be performed by determining how "recent" a projection dataset is, such as when the projection dataset was last updated or the latest timestamp contained in the projection dataset (which the database system 150 may track for each projection dataset), and then retrieving any data from the buffer 158 that has a timestamp after that time. Since the contents of the buffer 158 can already be in chronological order, very often the tail end of the buffer 158 can be retrieved to be added to the projection dataset.

At block 332, the query is then executed on the combined projection dataset(s). At block 333, the database system may optionally handle any instances where there are multiple processing steps (e.g., the partial query results from one or more combined projection datasets are enriched with data from the canonical dataset 156, as described in FIG. 2D, to obtain a full query result) or where partial query results from multiple combined projection datasets may need to be aggregated (e.g., sum together the number of rows returned from projection A and the number of rows returned from projection B).

At block 334, a full result of the query performed on the combined projection datasets is then returned to the user.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
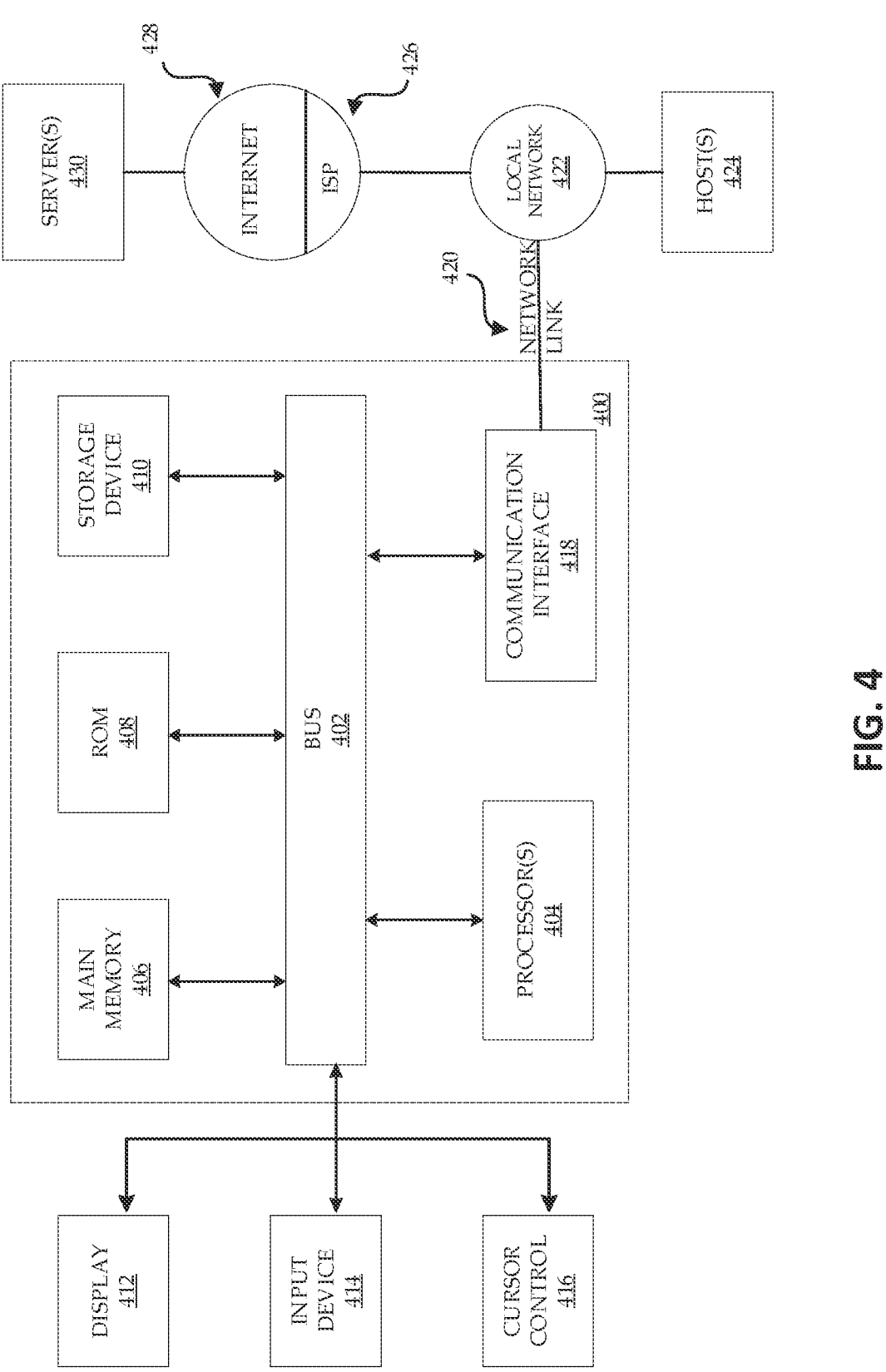
FIG. 4 illustrates a computer system with which certain methods discussed herein may be implemented.

For example, FIG. 4 is a block diagram that illustrates a computer system 400 upon which various embodiments may be implemented. Computer system 400 includes a bus 402 or other communication mechanism for communicating information, and a hardware processor, or multiple processors, 404 coupled with bus 402 for processing information. Hardware processor(s) 404 may be, for example, one or more general purpose microprocessors.

Computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

Computer system 400 may be coupled via bus 402 to a display 412, such as a cathode ray tube (CRT) or LCD display (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 400 may include a user interface module to implement a GUI that may be stored in a mass storage device as computer executable program instructions that are executed by the computing device(s). Computer system 400 may further, as described below, implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more computer readable program instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

Various forms of computer readable storage media may be involved in carrying one or more sequences of one or more computer readable program instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicate with a WAN). Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams.

The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
one or more non-transitory computer readable storage mediums configured to store:
program instructions;
a canonical dataset;
one or more projection datasets; and
a buffer; and
one or more processors configured to execute the program instructions to cause the system to:
access a first data chunk comprising an edit to the canonical dataset;
temporarily store the first data chunk in the buffer;
receive a query configured to execute on the canonical dataset;
analyze the query to determine a requested result of the query;
access the one or more projection datasets stored in the one or more non-transitory computer readable storage mediums to determine a selected projection dataset from among the one or more projection datasets to optimize query performance based on referencing projection rules associated with the one or more projection datasets to determine a projection rule that corresponds with the requested result, wherein the selected projection dataset is associated with the projection rule, the projection rule having been pre-applied to the selected projection dataset to obviate applying the projection rule to the selected projection dataset during query execution to reduce query execution time allowing the query to execute faster on the selected projection dataset than on other projection datasets of the one or more projection datasets to which the projection rule has not been pre-applied;

combine the selected projection dataset with the buffer in the one or more non-transitory computer readable storage mediums to form a combined projection dataset with data governed by the projection rule;

rewrite the query to execute on the combined projection dataset instead of the canonical dataset to produce the requested result of the query faster by executing on the combined projection dataset than by executing on the canonical dataset;

execute the rewritten query on the combined projection dataset; and return the requested result.

2. The system of claim 1, wherein the one or more processors is further configured to execute the program instructions to cause the system to:

combine the buffer with a second projection dataset asynchronously with combining the buffer to the selected projection dataset based on resource availability of the system to form a second combined projection dataset.

3. The system of claim 1, wherein the one or more processors is further configured to execute the program instructions to cause the system to:

transform the combined projection dataset according to a projection rule set associated with the selected projection dataset.

4. The system of claim 3, wherein transforming the combined projection dataset includes one or more of sorting data contents of the combined projection dataset and compacting the data contents of the combined projection dataset.

5. The system of claim 3, wherein the one or more processors is further configured to execute the program instructions to cause the system to:

combine the buffer with a second projection dataset to form a second combined projection dataset; and transform, according to a second projection rule set associated with the second projection dataset, the second combined projection dataset asynchronously with transforming the selected projection dataset based on resource availability of the system.

6. The system of claim 1, wherein the one or more processors is further configured to execute the program instructions to cause the system to:

transform the buffer according to a projection rule set associated with the selected projection dataset, wherein transforming the buffer includes one or more of sorting data contents of the buffer and compacting the data contents of the buffer.

7. The system of claim 1, wherein the one or more processors is further configured to execute the program instructions to cause the system to:

combine the buffer with the selected projection dataset by appending data contents of the buffer to data contents of the selected projection dataset.

8. The system of claim 1, wherein the one or more processors is further configured to execute the program instructions to cause the system to:

combine the buffer with the selected projection dataset by appending less than all data contents of the buffer to data contents of the selected projection dataset based on at least a timestamp associated with the selected projection dataset indicating a time the selected projection dataset was previously updated and one or more timestamps associated with data in the buffer.

9. The system of claim 1, wherein the one or more processors is further configured to execute the program instructions to cause the system to:

flush the first data chunk from the buffer.

10. A computer-implemented method comprising:

accessing a first data chunk comprising an edit to a canonical dataset;

temporarily storing the first data chunk in a buffer;

receiving a query configured to execute on the canonical dataset;

analyzing the query to determine a requested result of the query;

accessing one or more projection datasets stored in one or more non-transitory computer readable storage mediums to determine a selected projection dataset from among the one or more projection datasets to optimize query performance based on referencing projection rules associated with the one or more projection datasets to determine a projection rule that corresponds with the requested result, wherein the selected projection dataset is associated with the projection rule, the projection rule having been pre-applied to the selected projection dataset to obviate applying the projection rule to the selected projection dataset during query execution to reduce query execution time allowing the query to execute faster on the selected projection dataset than on other projection datasets of the one or more projection datasets to which the projection rule has not been pre-applied;

combining the selected projection dataset with the buffer in the one or more non-transitory computer readable storage mediums to form a combined projection dataset with data governed by the projection rule;

rewriting the query to execute on the combined projection dataset instead of the canonical dataset to produce the requested result of the query faster by executing on the combined projection dataset than by executing on the canonical dataset;

executing the rewritten query on the combined projection dataset; and returning the requested result.

11. The computer-implemented method of claim 10 further comprising:

transforming the combined projection dataset according to a projection rule set associated with the selected projection dataset.

12. The computer-implemented method of claim 10 further comprising:

transforming the buffer according to a projection rule set associated with the selected projection dataset, wherein transforming the buffer includes one or more of sorting data contents of the buffer and compacting the data contents of the buffer.

13. Non-transitory computer-readable media including computer-executable instructions that, when executed by a computing system, cause the computing system to perform operations comprising:

accessing a first data chunk comprising an edit to a canonical dataset;

temporarily storing the first data chunk in a buffer;

receiving a query configured to execute on the canonical dataset;

analyzing the query to determine a requested result of the query;

accessing one or more projection datasets stored in one or more non-transitory computer readable storage mediums to determine a selected projection dataset from among the one or more projection datasets to optimize query performance based on referencing projection rules associated with the one or more projection datasets to determine a projection rule that corresponds with the requested result, wherein the selected projection dataset is associated with the projection rule, the projection rule having been pre-applied to the selected projection dataset to obviate applying the projection rule to the selected projection dataset during query execution to reduce query execution time allowing the query to execute faster on the selected projection dataset than on other projection datasets of the one or more projection datasets to which the projection rule has not been pre-applied;

combining the selected projection dataset with the buffer in the one or more non-transitory computer readable storage mediums to form a combined projection dataset with data governed by the projection rule;

rewriting the query to execute on the combined projection dataset instead of the canonical dataset to produce the requested result of the query faster by executing on the combined projection dataset than by executing on the canonical dataset;

executing the rewritten query on the combined projection dataset; and returning the requested result.

14. The non-transitory computer-readable media of claim 13, wherein the computer-executable instructions, when executed by the computing system, further cause the computing system to perform operations comprising:

transforming the combined projection dataset according to a projection rule set associated with the selected projection dataset.

15. The non-transitory computer-readable media of claim 13, wherein the computer-executable instructions, when executed by the computing system, further cause the computing system to perform operations comprising:

transforming the buffer according to a projection rule set associated with the selected projection dataset, wherein transforming the buffer includes one or more of sorting data contents of the buffer and compacting the data contents of the buffer.

16. The system of claim 1, wherein the projection rule includes one or more of a data sorting rule, a data format rule, or a data aggregation rule.

17. The computer-implemented method of claim 10, wherein the projection rule includes one or more of a data sorting rule, a data format rule, or a data aggregation rule.

18. The non-transitory computer-readable media of claim 13, wherein the projection rule includes one or more of a data sorting rule, a data format rule, or a data aggregation rule.

* * * * *